United States Patent [19]

Watanabe et al.

[11] Patent Number: 4,713,746
[45] Date of Patent: Dec. 15, 1987

[54] METHOD FOR FORMING PICTURES

[75] Inventors: Yoshitaka Watanabe, Tokyo; Nobuaki Sakurada, Yokohama; Hideaki Kawamura, Tokyo; Yuichi Sato, Kawasaki, all of Japan

[73] Assignee: Canon Kabushiki Kaisha, Tokyo, Japan

[21] Appl. No.: 946,095

[22] Filed: Dec. 23, 1986

Related U.S. Application Data

[63] Continuation of Ser. No. 801,504, Nov. 25, 1985, abandoned, which is a continuation of Ser. No. 491,654, May 5, 1983, abandoned.

[30] Foreign Application Priority Data

May 14, 1982 [JP] Japan .................................. 57-81771
May 19, 1982 [JP] Japan .................................. 57-84170
Jul. 17, 1982 [JP] Japan .................................. 57-124768

[51] Int. Cl.$^4$ .......................... G01D 15/16; H04N 1/23
[52] U.S. Cl. ................................. 346/1.1; 346/140 R; 358/75; 358/298
[58] Field of Search .......................... 346/1.1, 75, 140; 358/75, 78, 283, 296, 298, 299

[56] References Cited

U.S. PATENT DOCUMENTS

| Re. 27,555 | 1/1973 | Loughren | 346/75 X |
|---|---|---|---|
| 1,656,338 | 1/1928 | Ranger . | |
| 1,790,723 | 2/1931 | Ranger . | |
| 1,817,098 | 8/1931 | Ranger . | |
| 3,197,558 | 7/1965 | Ernst . | |
| 3,404,221 | 10/1968 | Loughren . | |

(List continued on next page.)

FOREIGN PATENT DOCUMENTS

| 2422255 | 11/1974 | Fed. Rep. of Germany . |
|---|---|---|
| 3009333A1 | 9/1981 | Fed. Rep. of Germany . |
| 52-11712 | 1/1977 | Japan . |
| 53-102034 | 9/1978 | Japan . |
| 57-156264 | 9/1982 | Japan . |
| 58-60878 | 1/1983 | Japan . |
| 58-212970 | 10/1983 | Japan . |
| 59-52658 | 3/1984 | Japan . |
| 59-41969 | 8/1984 | Japan . |

OTHER PUBLICATIONS

Skinner et al.; Digital Color Printer, IBM Technical Disclosure Bulletin vol. 21 No. 5, Oct. 1978, pp. 1828-1829.

Primary Examiner—Joseph W. Hartary
Attorney, Agent, or Firm—Fitzpatrick, Cella, Harper & Scinto

[57] ABSTRACT

A picture-forming method comprises the steps of providing picture forming elementary particles having different optical densities; controlling the areas occupied by the respective picture forming elementary particles; and representing gradient by said different picture forming elementary particles while limiting the percentage of the gradient level area represented by the highest density elementary particle to said picture forming elementary particles to under 70% of the total area repsesented by said respective different picture forming elementary particles, thereby giving a picture which does not feel "rough". Apparatus is also disclosed for performing the method.

6 Claims, 32 Drawing Figures

U.S. PATENT DOCUMENTS

| | | |
|---|---|---|
| 3,681,650 | 8/1972 | Koll . |
| 3,683,212 | 8/1972 | Zoltan ............................ 346/140 X |
| 3,739,084 | 6/1973 | Heinrich . |
| 3,747,120 | 7/1973 | Stemme ........................ 346/140 X |
| 3,864,696 | 2/1975 | Fischbeck ........................ 346/140 |
| 3,961,306 | 6/1976 | Anstey . |
| 3,977,007 | 8/1976 | Berry ............................ 358/298 X |
| 4,050,077 | 9/1977 | Yamada ................................ 346/75 |
| 4,108,654 | 8/1978 | Goren . |
| 4,178,597 | 12/1979 | Isayama et al. . |
| 4,272,771 | 6/1981 | Furukawa . |
| 4,300,142 | 11/1981 | Kos . |
| 4,313,684 | 2/1982 | Tazaki et al. . |
| 4,314,274 | 2/1982 | Atoji et al. . |
| 4,339,774 | 7/1982 | Temple . |
| 4,342,051 | 7/1982 | Suzuki et al. . |
| 4,353,079 | 10/1982 | Kawanabe . |
| 4,365,275 | 12/1982 | Berman et al. . |
| 4,368,491 | 1/1983 | Saito . |
| 4,386,272 | 5/1983 | Check, Jr. et al. . |
| 4,389,712 | 6/1983 | Frattarola ...................... 358/298 X |
| 4,394,662 | 7/1983 | Yoshida et al. . |
| 4,394,693 | 7/1983 | Shirley . |
| 4,403,874 | 9/1983 | Payne ................... 400/124 |
| 4,412,225 | 10/1983 | Yoshida et al. ....................... 346/1.1 |
| 4,412,226 | 10/1983 | Yoshida ............................... 346/1.1 |
| 4,413,275 | 11/1983 | Horiuchi ........................... 358/75 X |
| 4,414,635 | 11/1983 | Gast et al. . |
| 4,431,319 | 2/1984 | Karaki et al. . |
| 4,438,453 | 3/1984 | Alston . |
| 4,446,470 | 5/1984 | Sugiyama et al. . |
| 4,468,706 | 8/1984 | Cahill . |
| 4,488,245 | 12/1984 | Dalke et al. . |
| 4,492,965 | 1/1985 | Ohnishi et al. . |
| 4,494,128 | 1/1985 | Vaught . |
| 4,499,479 | 2/1985 | Lee et al. . |
| 4,533,920 | 8/1985 | Suzuki ................................. 346/1.1 |
| 4,533,923 | 8/1985 | Suzuki . |
| 4,533,928 | 8/1985 | Sugiura . |
| 4,547,812 | 10/1985 | Waller et al. . |
| 4,549,222 | 10/1985 | Fogaroli et al. . |
| 4,559,542 | 12/1985 | Mita . |
| 4,560,997 | 12/1985 | Sato et al. . |
| 4,580,150 | 4/1986 | Tazaki . |
| 4,595,948 | 6/1986 | Itoh et al. . |
| 4,604,654 | 8/1986 | Sakurada et al. . |
| 4,631,578 | 12/1986 | Sasaki et al. . |
| 4,635,078 | 1/1987 | Sakurada et al. . |

FIG. 25

| INPUT (FROM MC) MSB → LSB | | | | | OUTPUT (TO DAC) MSB → LSB | | | | | | | HS | HEAD APPLIED VOLTAGE (V) | USED HEAD | REFLECTION DENSITY |
|---|---|---|---|---|---|---|---|---|---|---|---|---|---|---|---|
| 0 | 0 | 0 | 0 | 0 | 0 | 1 | 0 | 0 | 1 | 1 | 1 | 0 | 39 | H1 | 0.1 |
| 0 | 0 | 0 | 0 | 1 | 0 | 1 | 0 | 1 | 0 | 0 | 1 | 0 | 41 | H1 | |
| 0 | 0 | 0 | 1 | 0 | 0 | 1 | 0 | 1 | 0 | 1 | 1 | 0 | 43 | H1 | |
| 0 | 0 | 0 | 1 | 1 | 0 | 1 | 0 | 1 | 1 | 0 | 1 | 0 | 45 | H1 | |
| 0 | 0 | 1 | 0 | 0 | 0 | 1 | 1 | 0 | 0 | 0 | 0 | 0 | 48 | H1 | |
| 0 | 0 | 1 | 0 | 1 | 0 | 1 | 1 | 0 | 0 | 1 | 1 | 0 | 51 | H1 | |
| 0 | 0 | 1 | 1 | 0 | 0 | 1 | 1 | 0 | 1 | 1 | 1 | 0 | 54 | H1 | |
| 0 | 0 | 1 | 1 | 1 | 0 | 1 | 1 | 1 | 0 | 0 | 1 | 0 | 57 | H1 | |
| 0 | 1 | 0 | 0 | 0 | 0 | 1 | 1 | 1 | 1 | 0 | 1 | 0 | 61 | H1 | |
| 0 | 1 | 0 | 0 | 1 | 1 | 0 | 0 | 0 | 0 | 0 | 1 | 0 | 65 | H1 | |
| 0 | 1 | 0 | 1 | 0 | 1 | 0 | 0 | 0 | 1 | 0 | 1 | 0 | 69 | H1 | |
| 0 | 1 | 0 | 1 | 1 | 0 | 1 | 0 | 0 | 1 | 1 | 1 | 1 | 39 | H2 | 0.40 |
| 0 | 1 | 1 | 0 | 0 | 0 | 1 | 0 | 1 | 0 | 0 | 1 | 1 | 41 | H2 | |
| 0 | 1 | 1 | 0 | 1 | 0 | 1 | 0 | 1 | 0 | 1 | 1 | 1 | 43 | H2 | |
| 0 | 1 | 1 | 1 | 0 | 0 | 1 | 0 | 1 | 1 | 0 | 1 | 1 | 45 | H2 | |
| 0 | 1 | 1 | 1 | 1 | 0 | 1 | 1 | 0 | 0 | 0 | 0 | 1 | 48 | H2 | |
| 1 | 0 | 0 | 0 | 0 | 0 | 1 | 1 | 0 | 0 | 1 | 1 | 1 | 51 | H2 | |
| 1 | 0 | 0 | 0 | 1 | 0 | 1 | 1 | 0 | 1 | 1 | 1 | 1 | 55 | H2 | |
| 1 | 0 | 0 | 1 | 0 | 0 | 1 | 1 | 1 | 0 | 1 | 1 | 1 | 59 | H2 | |
| 1 | 0 | 0 | 1 | 1 | 0 | 1 | 1 | 1 | 1 | 1 | 1 | 1 | 63 | H2 | |
| 1 | 0 | 1 | 0 | 0 | 1 | 0 | 0 | 0 | 0 | 1 | 1 | 1 | 67 | H2 | |
| 1 | 0 | 1 | 0 | 1 | 1 | 0 | 0 | 0 | 1 | 1 | 1 | 1 | 71 | H2 | |
| 1 | 0 | 1 | 1 | 0 | 1 | 0 | 0 | 1 | 0 | 1 | 1 | 1 | 75 | H2 | |
| 1 | 0 | 1 | 1 | 1 | 1 | 0 | 0 | 1 | 1 | 1 | 1 | 1 | 79 | H2 | |
| 1 | 1 | 0 | 0 | 0 | 1 | 0 | 1 | 0 | 1 | 0 | 0 | 1 | 84 | H2 | |
| 1 | 1 | 0 | 0 | 1 | 1 | 0 | 1 | 1 | 0 | 0 | 1 | 1 | 89 | H2 | |
| 1 | 1 | 0 | 1 | 0 | 1 | 0 | 1 | 1 | 1 | 1 | 0 | 1 | 94 | H2 | |
| 1 | 1 | 0 | 1 | 1 | 1 | 1 | 0 | 0 | 0 | 1 | 1 | 1 | 99 | H2 | |
| 1 | 1 | 1 | 0 | 0 | 1 | 1 | 0 | 1 | 0 | 0 | 1 | 1 | 105 | H2 | |
| 1 | 1 | 1 | 0 | 1 | 1 | 1 | 0 | 1 | 1 | 1 | 1 | 1 | 111 | H2 | |
| 1 | 1 | 1 | 1 | 0 | 1 | 1 | 1 | 0 | 1 | 0 | 1 | 1 | 117 | H2 | |
| 1 | 1 | 1 | 1 | 1 | 1 | 1 | 1 | 1 | 1 | 0 | 1 | 1 | 125 | H2 | 1.0 |

METHOD FOR FORMING PICTURES

This application is a continuation of application Ser. No. 801,504 filed Nov. 25, 1985 now abandoned, which in turn is a continuation of U.S. Ser. No. 491,654 filed May 5, 1983, now abandoned.

BACKGROUND OF THE INVENTION

1. Field of the Invention

The present invention relates to a method and apparatus for forming pictures having gradient from picture information having gradient.

Although the present invention is applicable to various types of picture-forming apparatus such as ink jet printer, electrostatic printer and thermal transfer type printer, the present invention will be described in this specification mainly in connection with an ink jet printer.

2. Description of the Prior Art

In the art of ink jet printer there have been proposed and used the following methods to reproduce the gradient of a picture to be printed.

The first one of the known methods is to reproduce the gradient by changing the volume of ink jetted from the ink jet nozzle so that the difference in dot diameter represents the gradient.

The second one is to reproduce the gradient employing the known dither process. In this method, a picture element is composed of a matrix consisting of, for example, 4×4 minute picture elements.

According to the first method, only several levels of gradation can be represented. The reason for this is that it is difficult to obtain a broad range of printable dot diameters from the minimum to the maximum.

The second method is a method proposed to solve the above problem involved in the first method. According to the second method it is possible to reproduce seventeen gradient levels if a picture element is composed of a 4×4 matrix. However, since one picture element is composed of 4×4=16 minute picture elements, the printing speed is decreased down to 1/16 as compared with the first method. In order to maintain the same high speed as that in the first method, it is required to increase the number of printing heads by 16 times. Use of such many printing heads makes the construction and arrangement of heads very complicated. Furthermore, a very large electric circuit is required to carry out the picture processing according to the dither process, which results in large cost increases. Another drawback of the second method is found in that the picture element composed of a matrix is too large to give a good print. The minimum diameter of a printable dot is limited. At present the smallest possible dot diameter is about 70 μm. When a picture element is composed of a 4×4 matrix using the minimum dot diameter, the size of the picture element is 280 μm-400 μm in length of one side. This size of picture element may be acceptable for a large picture print. However, for those prints which man usually views at the distance of distinct vision (25-30 cm), this size of picture element is too large.

If one wishes to obtain a sufficiently broad gradient range with a smaller picture element, it is required to reduce the size of every dot and also to increase the color density thereof. However, if gradient of relatively low level is represented by such dots each having a small area and high color density, then the printed picture looks rough and unnatural. When one looks at the picture, he has a feeling that the picture lacks repose.

The "unnaturalness" of the obtained print becomes very remarkable in particular in representations of the highlight portion of picture or in representations of human skin. Generally there is difficulty in smoothly reproducing halftones over a broad range.

In an attempt to attain better reproduction of gradient, it can be considered to use inks having different densities in a color.

Where two inks different in density are used according to this method, a picture portion having a density of optical reflection in a certain definite area (hereinafter the density of optical reflection in a certain definite area is referred to as the average density of optical reflection) can be represented in two different manners while using a desired dot pitch (pitch at which the dots are arranged). One is to form small diametered (small dot area) dots by dark or deep (higher color density) ink. Another is to form large diametered dots by light or pale (lower color density) ink. Of course, the use of two inks, dark and light, should be understood as mere example of useful combinations of inks according to the method. Three or more inks different from each other in density and also in color may be used in the same manner.

However, this recording method also has some disadvantages. Even when the two pictures formed in the above two different manners have substantially the same average density of optical reflection, they look different from each other to human eyes when the produced pictures are viewed. The degree of difference between the two pictures which is belt varies depending on the ink density and the dot pitch. However, generally speaking, the picture reproduced by high density and small diametered dots gives a stronger impression of "roughness" and feels much more unnatural to human eyes. In representations of gradient of common pictures, therefore, naturalness has often been lost from the pictures by use of such recording method.

Also, an attempt has been made to represent the lowest density (the lowest gradient level) of picture by not forming dots there. However, in this case, there is produced in the image a portion left white, the tone of which differs with the tone of other portions where dots have been formed which gives it a heterogeneous tone. Therefore, this method also has resulted in poor quality of picture.

SUMMARY OF THE INVENTION

Accordingly, it is an object of the present invention to overcome the drawbacks and disadvantage of the prior art and provide a method and apparatus for forming pictures which reproduce gradient in a simple manner thereby producing good quality pictures.

It is another object of the invention to provide such picture-forming method and apparatus which enables obtaining good pictures which do not look rough and unnatural and which are reposeful.

It is a further object of the invention to provide an ink jet printer operable according to the above-mentioned improved picture-forming method of the invention.

The term "picture forming elementary particle" as used herein means so-called dot or its equivalent formed on a recording member in dot recording such as ink jet recording, thermal recording, thermal transfer recording, wire dot recording or electrostatic recording. In forming pictures according to the invention, when one picture element is composed of one picture forming elementary particle, a picture element just corresponds to a picture forming elementary particle. However, it is to be noted that when one picture element is composed of a plural number of picture forming elementary particles, a picture element does not correspond to a picture forming elementary particle. In this case, one picture forming elementary particle and one picture element should be understood to mean different things.

The terms "density of optical reflection" and "density (color density)" of ink used herein respectively mean the density of optical reflection and the density of optical transmission measured by a densitometer commercially available. In measuring the reflection density we have used as the reference value a value obtained using the standard white paper widely used for this purpose.

Other objects, features and advantages of the invention will appear more fully from the following description taken in connection with the accompanying drawings.

BRIEF DESCRIPTION OF THE DRAWINGS

FIG. 25 shows the relationship among the input digital value and output command of the matrix circuit MXC, selected head and reflection density;

DETAILED DESCRIPTION OF THE PREFERRED EMBODIMENTS

In the first embodiment of the invention there are used inks which are the same in color but different from each other in density.

Figure 1:
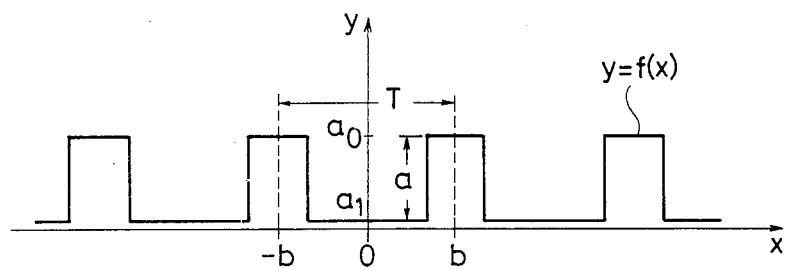
FIGS. 1 to 7 illustrate the relationship among the density of picture forming elementary particle (dot), duty ratio of the same, pitch of the same and picture quality.

Before entering the detailed description of the first embodiment, we will describe an example of theoretical analysis of the picture design on which the present picture-forming method is based. In the analysis, a simplified model was used. The model used was a one-dimensional model as shown in FIG. 1. The object of analysis used was a picture represented in a sufficiently large area on a recording medium by recording dots having a determined dot diameter with a certain color density and at a constant dot pitch. The picture was space-frequentially analyized.

In fact, dots are two-dimensionally arranged on a recording medium. But, for a space-frequential analysis it may be considered as one-dimensional arrangement on a rectilinear line passing through the center of dots. The density distribution is represented by f(x) in FIG. 1 wherein x is the coordinate of position of dot on the straight line and y is the density of optical reflection at the position x. The reflection density of the recording medium (such as paper) is denoted by $a_0$ (the density of optical reflection: $-\log a_0$), the reflection density of color dot (including both of colored dot and non-colored dot) by $a_1$ (the density of optical reflection: $-\log a_1$), the dot diameter by b and dot pitch is denoted by T. And $a = a_0 - a_1$.

Assuming that dots are arranged in a sufficiently large area on the recording medium and that the number of dots is $(2N+1)$ as an example, the Fourier transformation of the f(x) is:

$$F_N(\omega) = \int_{-\frac{T}{2}+NT}^{\frac{T}{2}+NT} f(x)e^{j\omega x}dx \qquad (1)$$

$$= \sum_{n=-N}^{N} \int_{-\frac{T}{2}+nT}^{\frac{T}{2}+nT} f(x)e^{j\omega x}dx$$

$$= \sum_{n=-N}^{N} \left\{ \int_{-\frac{T}{2}+nT}^{\frac{T}{2}+nT} a_1 e^{j\omega x}dx - \int_{-b+nT}^{b+nT} a e^{j\omega x}dx \right\}$$

$$= a_1 \int_{-\frac{T}{2}+NT}^{\frac{T}{2}+NT} e^{j\omega x}dx - a \sum_{n=-N}^{N} \left[ \frac{e^{j\omega x}}{j\omega} \right]_{-b+nT}^{b+nT}$$

$$= a_1 \int_{-\frac{T}{2}+NT}^{\frac{T}{2}+NT} e^{j\omega x}dx - 2ab \frac{\sin b\omega}{b\omega} \cdot \sum_{n=-N}^{N} e^{jn\omega T}$$

Assuming that N is sufficiently large, the first term of the above formula (1) may be regarded as a delta function. Further $$\sum_{n=-N}^{N} e^{jn\omega T}$$

of the second term also may be regarded as a delta function sequence.
Therefore it may be said that $$\omega = \frac{2\pi}{T} k.$$

From it $$F_N(\omega) \rightarrow a_1 \delta(\omega) - \frac{2ab}{T} \cdot \frac{\sin b\omega}{b\omega} \delta(\omega - \omega_0 k)$$

wherein, $\omega_0 = 2\pi T$ and k is an integer.

When N is sufficiently large, represent $F_N(\omega)$ by $F(\omega)$. Then, in conclusion, $$F(\omega) = a_1 \delta(\omega) - \frac{2ab}{T} \cdot \frac{\sin b\omega}{b\omega} \cdot \delta(\omega_0 k - \omega) \quad (2)$$

$$\left[ \text{where, } \omega_0 = \frac{2\pi}{T}, k = \text{integer} \right]$$

$$F(\omega) = \left( a_1 - \frac{2ab}{T} \right) \delta(\omega) - \frac{2ab}{T} \cdot \frac{\sin b\omega}{b\omega} \delta(\omega - \omega_0 l) \quad (3)$$

$$\left[ \text{where, } \omega_0 = \frac{2\pi}{T}, l \text{ is an integer other than } 0 \right]$$

Figure 2:
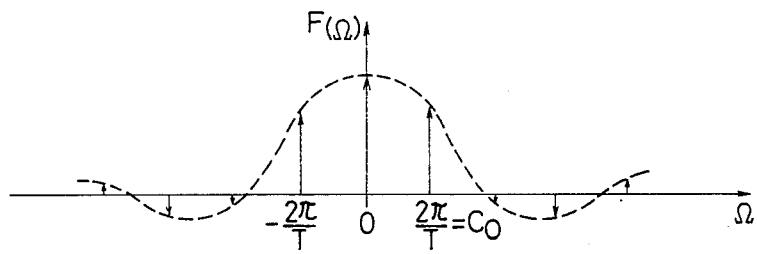

FIG. 2 shows a result as obtained from the equation (3) as an example. As seen from FIG. 2, it has a direct current (DC) component at $\omega = 0$ and further a spatial angular frequency component in the form of impulse at a period of $2\pi/T$. The relationship between $\omega$ and space-frequency f is given by:

$$\omega = 2\pi f \quad (4)$$

Therefore, on the spatial frequency axis there appears the spatial frequency component in the form of impulse at a period of 1/T. Rewriting the above formula (3) gives:

$$F(f) = \left( a_1 - \frac{2ab}{T} \right) \delta(f) - \frac{2ab}{T} \frac{\sin 2\pi bf}{2\pi bf} \delta(f - f_0 l) \quad (5)$$

$$\left[ \text{where, } f_0 = \frac{1}{T}, l \text{ is an integer other than } 0 \right]$$

Figure 3:
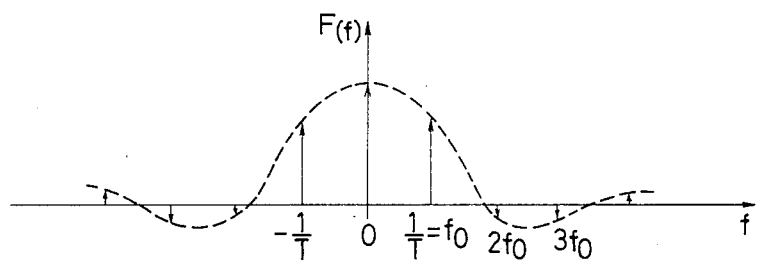

An example of results as obtained from the equation (5) is shown in FIG. 3.
Define the duty ratio as $$D = 2b/T \quad (6).$$

Then, $$F(f) = (a_1 - aD) \delta(f) - aD \left( \frac{\sin \pi DTf}{\pi TDf} \right) \delta(f - f_0 l) \quad (7)$$

$$\left[ \text{where, } f_0 = \frac{1}{T}, l \text{ is an integer other than } 0 \right]$$

In the equation (7), the first term is DC component and means that the average reflection density is $(a_1 - a_D)$ The second term is high frequency component and means that when l=1, it corresponds to a component of frequency 1/T and its value is $$F(f_0) = aD \frac{\sin \pi DTf_0}{\pi TDf_0} = aD \left( \frac{\sin \pi D}{\pi D} \right) = \frac{a}{\pi} \sin \pi D \quad (8)$$

Where a picture is to be represented, for example, by a dot arrangement at a frequency of $f_0$, the frequency band area in which the picture can practically be represented by such dot arrangement is limited to about $f_0/2$ according to the sampling theory. Higher frequency component than that is regarded as noise. However, since the resolving power of human eyes is about one minute and the resolving power of human eyes on a recording medium at so-called distinct vision distance (25–30 cm) is 10 lp/mm (20 bright-dark lines per mm) at most, such frequency component exceeding 10 lp/mm is negligible in practice. Therefore, from the result shown in FIG. 3, providing that $2f_0 = 10$ lp/mm, we can conclude that in practical point of view the frequency component which has a large effect on human perception of picture quality is the component in the order of $f_0 = 5$ lp/mm. In other words it may be said that in practical sense human perception of picture quality is greatly affected by the value of the power spectrum $F^2$ $(f_0)$ of frequency $f_0$.

From the above equation (8), the power spectrum $F^2$ $(f_0)$ at $f_0$ is represented by:

$$F^2 (f_0) = (a/\pi)^2 \sin \pi D \quad (9)$$

Figure 4:
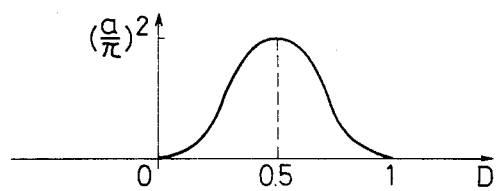

When the duty ratio D is changed from 0 to 1, therefore, the power spectrum $F^2 (f_0)$ becomes a sine function as shown in FIG. 4. At D = 0.5, it has the maximum value and it becomes 0 at D = 0 and D = 1.

This means that when the duty ratio is 0.5, the largest stimulus will be given to human eyes looking at the picture and it will appear rough.

Since the power spectrum can be represented by (9), it is variable depending on the difference in reflection density a between dot itself and recording medium itself. $F^2 (f_0)$ becomes smaller with decreasing of the reflection density difference a. Therefore, for representation of the same average reflection density, it is preferable that there is used ink having a color density as low as possible. In practice, it may be 1 attained by examining the change of the value of $F^2 (f_0)$ while changing a and D until the first term $(a_1 - aD)$ of the equation (7) representing the average reflection density becomes constant.

For instance, in the case where a picture of the same average reflection density is to be represented by using such ink whose dot reflection density on the recording medium is $(a_1 - a_\alpha)$ and arranging the dots in such manner as to give a duty ratio of $D_\alpha$, the condition to be satisfied is:

$$[a - (a_1 - a_\alpha)D\alpha] = \text{constant}. \quad (10)$$

From the condition of (10), $a_\alpha D_\alpha = \text{constant}$. (11)

Consequently, the power spectrum F $(f_0)$:

$$F\alpha^2(f_0) \propto \left(\frac{a_\alpha}{\pi}\right)^2 \sin^2 \pi D_\alpha \qquad (12)$$

$$\propto \left(\frac{\sin \pi D_\alpha}{\pi D_\alpha}\right)^2$$

Figure 5:
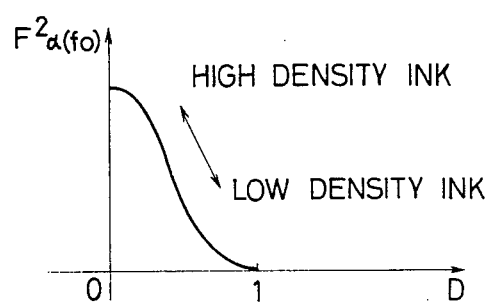

Within the range of $0 \leq D \leq 1$, the value of the formula (12) decreases continuously as shown in FIG. 5. Consequently, the value of $F_\alpha^2(f_0)$ becomes smaller with approaching of the duty ratio of 1.

Figure 6:
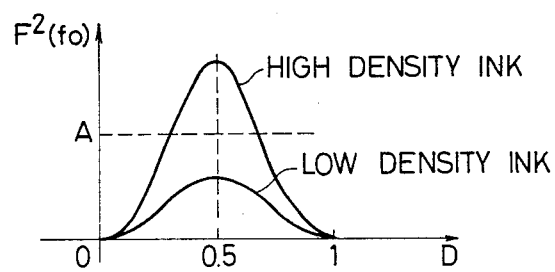

In summary, pictures of improved quality can be obtained when the reflection density difference a between dot and recording medium, is reduced as much as possible (the density of ink used is as low as possible) and the duty ratio is made near to 1 as much as possible. To demonstrate it FIG. 6 is given. FIG. 6 shows that the power spectrum $F\alpha^2(f_0)$ becomes the maximum at $D=0.5$ for both of high density ink and low density ink and that the maximum value for low density ink is remarkedly smaller than that for high density ink. This demonstrates that the picture quality in human's impression can be improved by use of ink having lower density. Also it has been experimentally proved that when a low density ink is used, man does not feel the picture rough even for duty ratio $D = 0.5$ whereas, when a high density ink is used, man feels it rough. Let A denote the minimum value of the power spectrum $F^2(f_0)$ at which "roughness" of picture is notable to human's eyes. Then, the range of duty ratio D which brings about an adverse effect on picture quality will be above A. Therefore, a good quality picture as a whole can be obtained by reducing the percentage of such portion over A.

Figure 7:
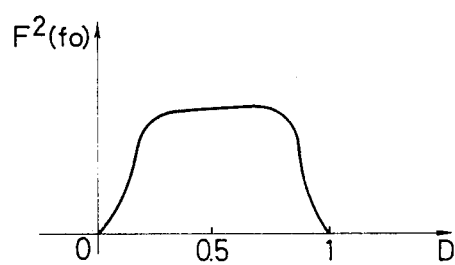

Taking the high frequency component into account, the power spectrum $F^2(f_0)$ gives a characteristic curve as shown in FIG. 7. In this case also, the above description is applicable.

For reference, the conditions under which the characteristic curves in FIG. 6 were obtained are given under.

Dot frequency $f_0$ was 5 dots per mm (5 PEL in PEL expression), that is, dot pitch T was 200 $\mu$m; As the high density ink there was used ink whose density was in the range of 2 to 5%. As the low density ink there was used ink whose density was in the range of 0.2 to 0.5%. Using the inks experiments were conducted in which a picture was formed by ink dots on a white paper sheet whose reflection density was about 0.1 (reflectance: about 80%). In these experiments of picture formation conducted under the same conditions (the same PEL number and the same recording medium), the power spectrum $F^2(f_0)$ at duty ratio $D = 0.5$ exceeded the value of A in FIG. 6 when the density of the ink used was 0.6 (%) (the reflection power of the formed dot: about 10%) or higher.

In the above, the theoretical analysis has been made providing that N is sufficiently large. However, it is obvious that the above conclusion is applicable to all of the cases of N being larger than 1. Also, the theoretical analysis has been carried out using not the absolute density of ink dot but the relative density of the ink dot to the used recording medium. However, as the recording medium there are usually used white papers whose optical density is extremely low (in the order of about 0.1). Taking it into consideration, the above conclusion may be deemed to be true in general even if only the absolute density of ink dot is discussed.

The characteristic curves shown in FIG. 6 are naturally variable depending on the dot frequency $f_0$, that is, on PEL number. As previously noted, the resolving power of human's eyes is about 10 PEL. Therefore, although the characteristic curves are variable, it is right to say that the above-mentioned problem of "rough" arises only when the PEL number is above 10 PEL, that is, for a dot pitch less than 100 $\mu$m. More concretely, as will be understood from the foregoing, it becomes a problem in particular when PEL is in the range of 4 to 6 (because PEL number lower than the range is generally unsuitable for the representation of picture and PEL number higher than the range will less produce the problem of "rough").

Although the characteristic curves shown in FIG. 6 are those for black inks, it is to be understood that similar tendency to the above are observed for inks in other colors.

The picture-forming method of the present invention has been particularly shown and described with reference to an embodiment wherein picture has been formed employing the ink jet recording process. However, the application of the present invention is never limited to the ink jet recording method only. It is equally applicable other recording method such as electrophotographic recording method, thermal transfer recording method and electrostatic recording method.

As described above, according to the method of the present invention, the percentage of area Hmax to total area Htot is limited to under 70% wherein Hmax is the area of the gradient level represented by image forming elementary particles of the highest optical density and Htot is the total of the respective gradient level areas ($H_1, H_2, H_3 \ldots$) represented by the respective groups of picture forming elementary particles. To attain the object of the invention more effectively it is preferable that the percentage of Hmax in Htot be under 60% and more preferably under 55%.

Preferred embodiments of the method for representing gradient will hereinafter be described with reference to FIGS. 8 to 12.

In these figures the shape of picture forming elementary particle is regarded as circular and its diameter is denoted by l. When picture forming elementary particles of l diameter are continuously arranged on a recording medium at a determined PEL number, there is obtained an average density of optical reflection which is denoted herein by $\overline{D}r$ (also referred to sometimes as "optical reflection density"). FIGS. 8 to 12 show the relationship between the diameter and the average density $\overline{D}r$.

The average density of optical reflection $\overline{D}r$ in the embodiments has been measured in the following manner:

A 10 mm square area was selected on a standard white paper (baryta paper) as commonly used and the reflection density of the selected area was measured with a densitometer commercially available. Using the measured value as a reference value the densitometer was set to measure the reflection density of a sample. The sample was prepared by continuously arranging the picture forming elementary particles on a recording medium such as a sheet of paper at a determined PEL number. To measure the reflection density thereof, a 10 mm square area was sampled therefrom. $\overline{D}r$ is the value of the reflection density measured on the sample in this manner.

In FIG. 8 through 12, these measured average densities of optical reflection are plotted on the ordinate axis in a normalized form with the maximum measured value $\overline{D}r(max)$ being 1.

Figure 8:
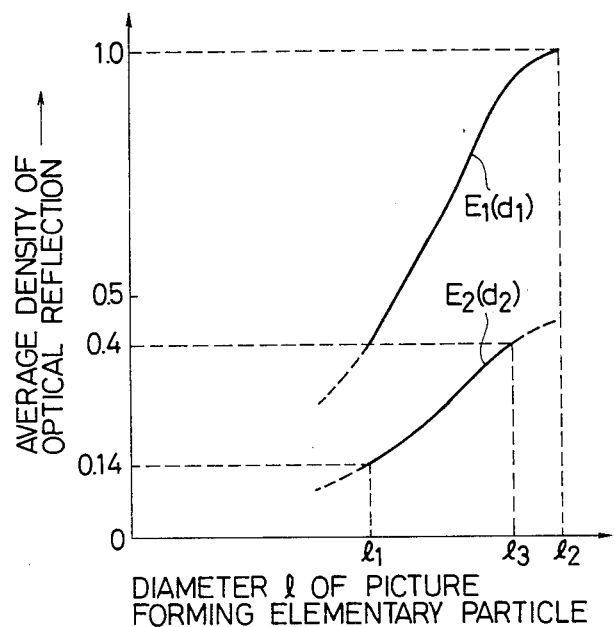
FIGS. 8 to 12 illustrate the relationship between the area of picture forming elementary particle and the average density of optical reflection which are factors determining the picture design according to the picture-forming method of the invention.

In the embodiment of FIG. 8, two kinds of picture forming elementary particles E1 and E2 are used which are different from each other in optical reflection density. Among the picture forming elementary particles E1 of high reflection density such elementary particle which represents the lowest level gradient is referred to as E1(min). Similarly, among the particles E2 of low reflection density such particle which represents the lowest level gradient is referred to as E2(min). FIG. 8 shows the case where the diameter of the elementary particle E1(min) is equal to that of E2(min).

In the embodiment of FIG. 8, the gradient in the range of the average density $\overline{D}r$ from 0.4 to 1.0 can be represented continuously and smoothly by modulating the diameter of the elementary particle E1 of reflection density d1 (higher reflection density or concentration) from $l_1$ to $l_2$.

On the other hand, the gradient in the range of $\overline{D}r$ from 0.15 to 0.4 can be represented continuously by modulating the diameter of the elementary particle E2 of reflection density d2 (lower reflection density or concentration) from $l_1$ to $l_3$.

In the practical use of the present invention, the individual gradation levels are actually represented by the solid line portions of the curves in FIG. 8. However, it is obvious that the gradation of lower level can be represented by further reducing the diameter of the elementary particle E1 and also the gradient of higher level can be represented by further increasing the diameter of the elementary particle E2 as suggested by the broken lines in FIG. 8. The same may be said of other embodiments shown in the following figures.

In the embodiment shown in FIG. 8, the picture forming elementary particle E1 is used to represent the gradient on high level side and E2 to represent the gradient on low level side. The border line between the two gradient areas lies at $\overline{D}r = 0.4$. The gradient at the border line ($\overline{D}r = 0.4$) may be represented either by E1 or by E2. However, in view of impression on the obtained picture quality it is preferable to represent the gradient at the border line by E2. It has experimentally been found that when two kinds of picture forming elementary particles which are greatly different from each other in diameter are used to represent the same gradient level, better quality and more natural pictures can be produced by the elementary particles of lower reflection density rather than that of higher reflection density. It has also been found that in the case in which high density picture forming elementary particles are used to represent gradient, a picture of good quality can be obtained in particular when the elementary particles are arranged so as to represent the gradient in such area in which the duty ratio is above 0.5. In other words, in such case where if the gradient level is represented by picture forming elementary particles having a high reflection density, the duty ratio necessarily becomes below 0.5, it is preferable to represent the same gradient level by use of lower density elementary particles than that.

Figure 9:
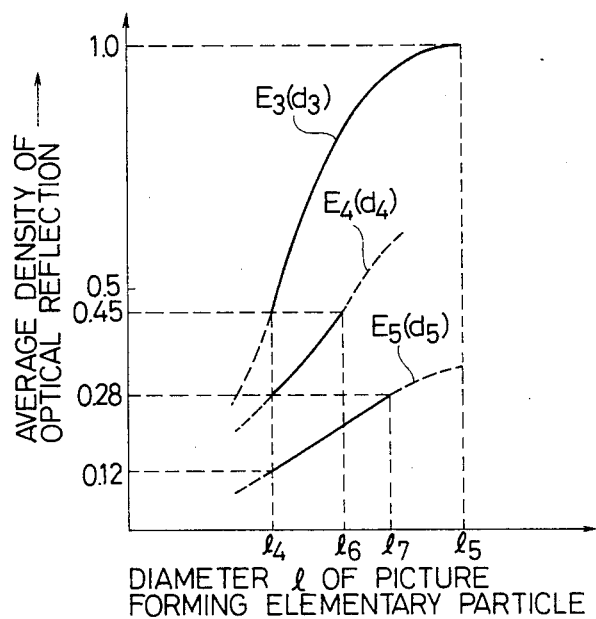

In the embodiment shown in FIG. 9 there are used three kinds of picture forming elementary particles E3, E4 and E5 having different reflection densities d3, d4 and d5 respectively. Except this point, this embodiment is essentially the same as that of FIG. 8.

The reflection density d5 of the elementary particle E5 is low. By continuously modulating the diameter of the particle E5 from $l_4$ to $l_7$, gradient in the range of the average density of optical reflection $\overline{D}r$ from 0.12 to 0.28 can be represented continuously by it. The reflection density d4 of the elementary particle E4 is medium. Similarly to the above, gradient in the range of $\overline{D}r$ from 0.28 to 0.45 can be represented by continuously modulating the diameter of the particle E4 from $l_4$ to $l_6$. The reflection density d3 of the elementary particle E3 is high. By continuously modulating the diameter of the particle E3 from $l_4$ to $l_5$, gradient in the range of 0.45 to 1.0 ($\overline{D}r$) can be represented.

Figure 10:
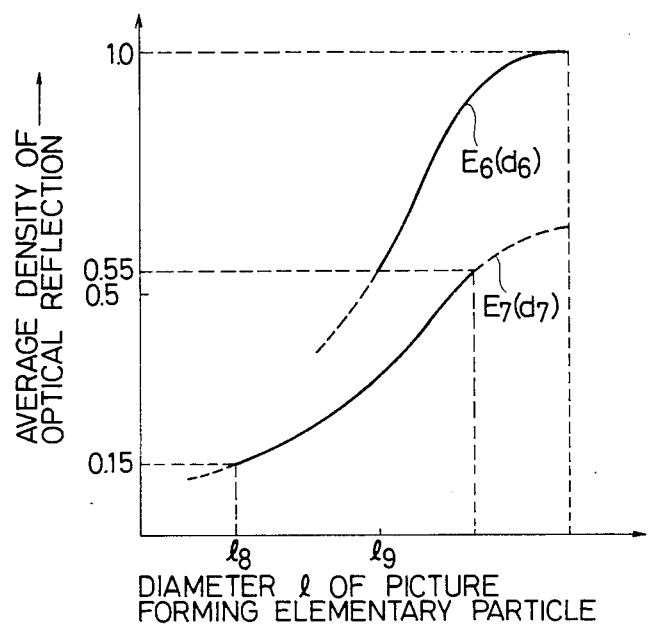
Figure 11:
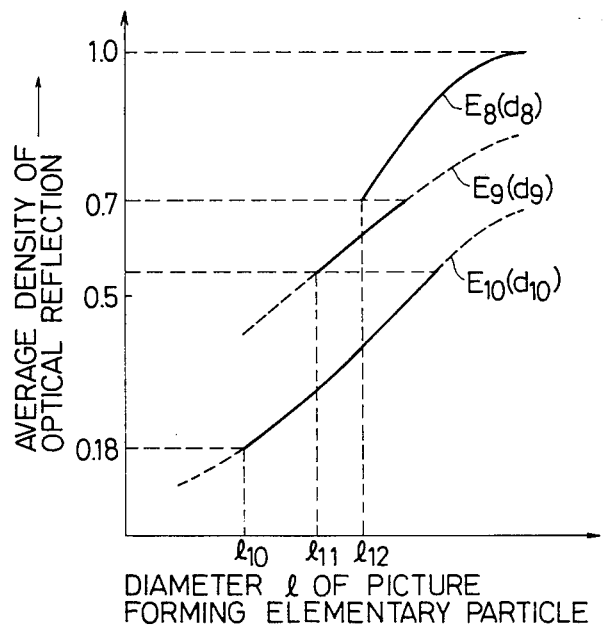

FIGS. 10 and 11 show additional preferred embodiments.

In the embodiment of FIG. 10 there are used two kinds of picture forming elementary particles whereas in the embodiment of FIG. 11 there are used three kinds of picture forming elementary particles having different reflection densities.

An important difference between the embodiments shown FIGS. 10 and 11 and the above shown embodiments in FIGS. 8 and 9 is found in the manner of setting of particle diameter. In the embodiments of FIGS. 10 and 11, the diameter of the elementary particle for representing the minimum gradient level is determined according to the reflection density thereof. More particularly, setting of diameter for this group of elementary particles is made in such manner that the particle having higher reflection density has a larger diameter.

Referring to FIG. 10, E6 denotes picture forming elementary particles of high optical reflection density and E7 denotes picture forming elementary particles of low optical reflection density. Among the high density elementary particles E6 such elementary particle for representing the minimum level gradient is herein referred to as E6(min). Similarly, among the low density elementary particles E7 such particle for representing the minimum level gradient is referred to as E7(min). In this embodiment, the diameter of the elementary particle E6(min) has been set to a value smaller than the diameter of the particle E7(min). In this manner, according to the embodiment, even in one and the same picture forming elementary particle groups, the elementary particles have different diameters. So, the particle having higher reflection density has a larger diameter. By setting the diameter of the elementary particle in this manner there are obtained more preferable pictures which give a better impression of picture quality to one who looks at the picture.

In the embodiment shown in FIG. 11, gradation is represented by three groups of picture forming elementary particles E8, E9 and E10 the optical reflection densities of which are d8, d9 and d10 (d8 > d9 > d10) respectively.

Also in this embodiment of FIG. 11, such elementary particle representing the minimum level gradient in each group has a diameter decreased according to its reflection density. Thus, elementary particles having lower optical reflection density have smaller diameter.

Figure 12:
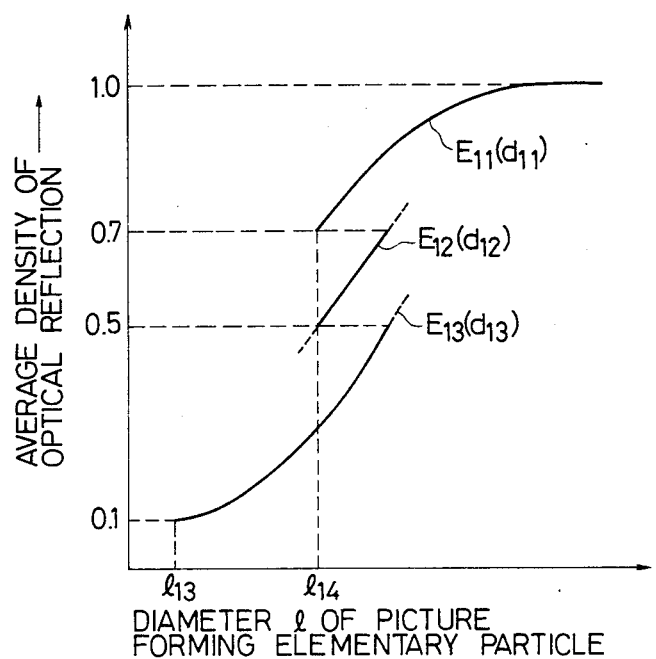

FIG. 12 shows another embodiment. E11 denotes picture forming elementary particles of high reflection density group, E12 does those of medium reflection density group and E13 does those of low reflection density group. In the groups E11 and E12, the same diameter is given also to such elementary particles for representing the minimum level gradient. However, in the low density particle group E13 the diameter of such particles for representing the minimum level gradient is decreased as compared to other ones in the manner as described above.

As will be understood from the foregoing, good quality pictures can be obtained by representing the gradient of the same level by use of picture forming elementary particles having lower optical reflection density with the provision that it does not reduce the degree of resolution. In the picture obtained by it, the portion left white is not notable to human's eyes. The picture does not give man a feeling of "rough" and "lack of repose" and is of good quality.

Apparatus for carrying out the above-described method will hereinafter be described in details with reference to FIGS. 13 through 15.

Figure 13A:
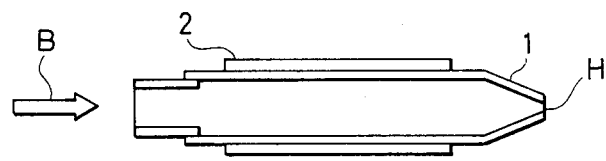
FIG. 13A is a schematic sectional view of the same type of ink jet head as that used in an embodiment of the present invention.
Figure 13B:
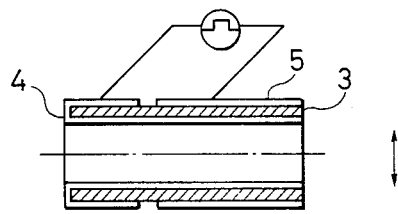
FIG. 13B is a schematic sectional view of a piezoelectric element.
Figure 14:
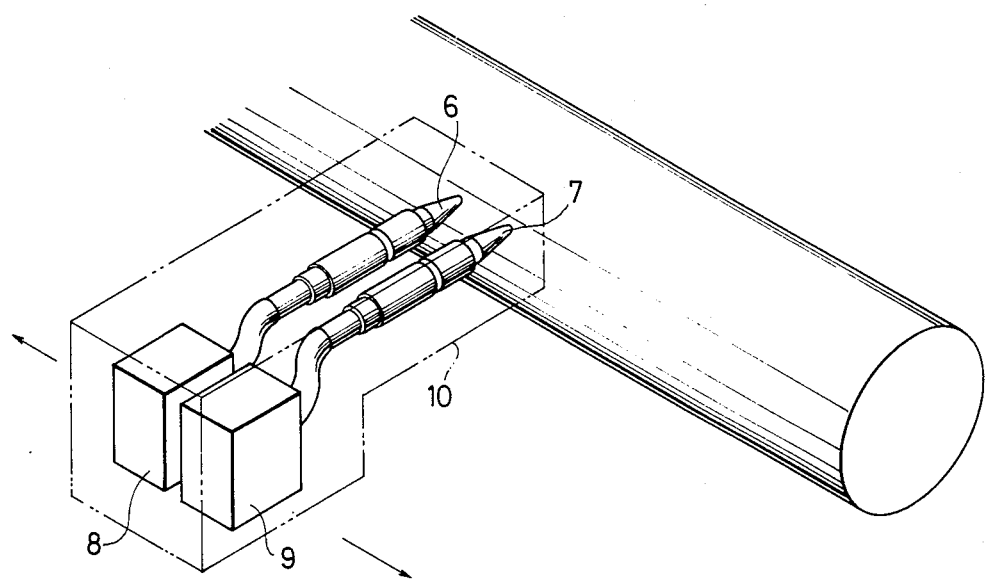
FIG. 14 is a schematic sectional view of an ink jet head unit.
Figure 15:
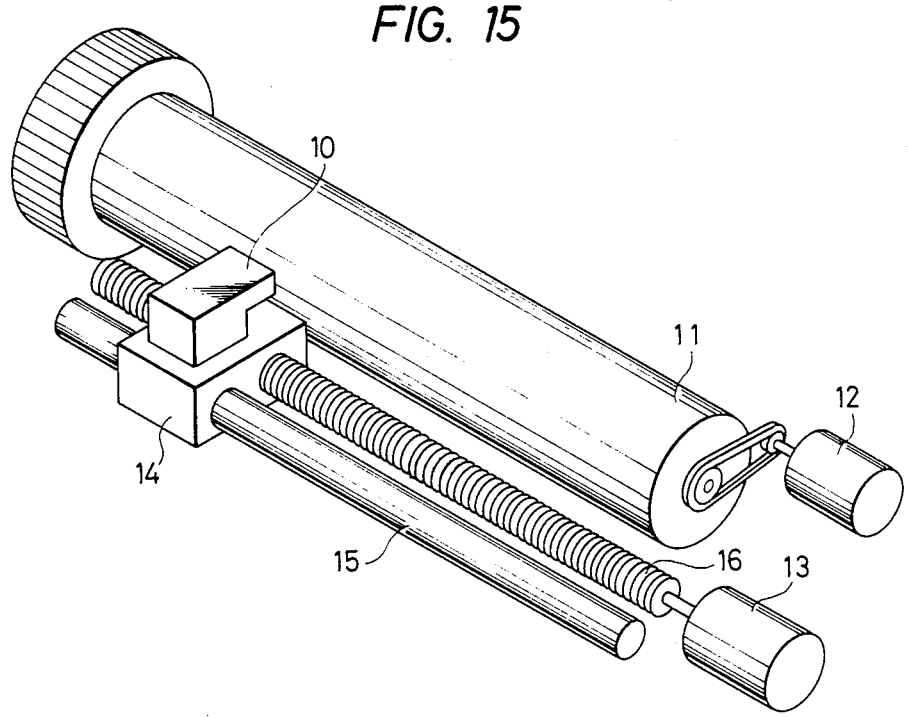
FIG. 15 is a schematic perspective view of a recording apparatus in which the head unit as shown in FIG. 14 has been used.

Although the apparatus shown in FIGS. 13 to 15 is an ink jet recording apparatus, as previously noted, it is to be understood that the present invention is applicable also to other various recording apparatus including electrophotographic recording apparatus, thermal recording apparatus and electrostatic recording apparatus.

FIG. 13 schematically shows an ink jet recording head as used in the ink jet recording apparatus.

Designated by 1 is a glass tube having a tapered tip end portion. The glass tube 1 is surrounded by a cylindrical piezo-electric element 2. 3 is tubular piezo body. 4 and 5 are electrodes. When a voltage is applied between the electrodes 4 and 5, the piezo-electric element 2 constricts radially inwards and then restores to its original state. Liquid ink is fed into the glass tube 1 in the direction of arrow B. By the action of constriction and restoration of the piezo-electric element, the ink is jetted from the orifice of the glass tube 1 as ink droplet. The size of ink droplet is variable by changing the level and width of applied voltage signal to the piezo-electric element 2. For example, in the shown embodiment, it was possible to modulate the size of droplet within the range of up to three times (as dot diameter).

However, the dot diameter modulation range obtainable varies depending on various factors such as the shape and jet characteristics of the used recording head, physical properties of the used ink, the driving conditions of the head etc. A modulation range of dot diameter up to 7-8 times is not impossible to obtain. Even for the same ink jet recording apparatus, the obtainable range of dot diameter modulation is variable according to the kind of recording process then used.

As will be described under, according to the embodiment, there are used two or more different kinds of ink which are different from each other in color density to attain the reproduction of gradient in a broader range, together with the above dot diameter modulation.

As shown in FIG. 14, in this embodiment there is used an ink jet head unit 10 provided with two heads 6 and 7 connected to ink tanks 8 and 9 respectively. The ink contained in the tank 9 is different from that in the tank 8 in density (that is, concentration) of ink. With the head unit 10 the reproduction of broadly ranging gradient has satisfactorily been accomplished according to the method described above. Especially for photographic pictures very good and faithful reproduction of gradient has been attained. In the reproduced pictures the quality of representation of the highlight area and the skin of the object person have been excellent. The quality was comparable to that of a picture obtained by silver salt photography.

The number of inks having different densities is not limitative. Three or more different kinds of inks also may be used in the present invention. The densities of the different inks may be suitably determined in accordance with the object for which the inks are used.

However, the density of ink for forming the highest optical density picture forming elementary particle should be determined to satisfy the condition that the percentage of area of the gradient represented by the highest density elementary particles should be less than 70% to the total of gradient area represented by the respective picture forming elementary particles formed by the respective inks having different densities. The ink density satisfying the requirement is determined at the step of ink design.

In the case of ink jet recording method, the content of coloring material (dyestuff pigment, dyepigment) in the ink commonly used for practical purpose is about several % by weight at most. Although the content is relatively low, many kinds of inks having different optical densities can be prepared without difficulty by changing the content of coloring material in the limit range.

FIG. 15 shows the essential part of a printer on which the head unit 10 as shown in FIG. 13 has been mounted.

In FIG. 15, 11 is a platen, 12 is a paper feed stepping motor and 13 is a carriage driving motor. 14 is a carriage having the head unit 10 mounted thereon. The carriage 14 is driven by the motor 13 through a screw 16 and moves along a guide 15.

Using the ink jet recording apparatus shown in FIGS. 13 to 15 some experiments of printing have been conducted to know the relationship between dot diameter and average (optical) reflection density $\overline{Dr}$. In these experiments dots have been formed at 5 PEL. FIGS. 16 through 21 show the relation curves obtained in these experiments.

Throughout FIGS. 16–21 the average density of reflection $\overline{Dr}$ is on the ordinate having normalized values with the maximum value $\overline{Dr}(max)$ being 1. Dot diameters are plotted on the abscissa in $\mu m$. The solid line indicates the area in which the ink has been used. The broken line indicates the area in which the ink has not been used in actual printing in these embodiments although useful for represent the gradient of the level area.

Figure 16:
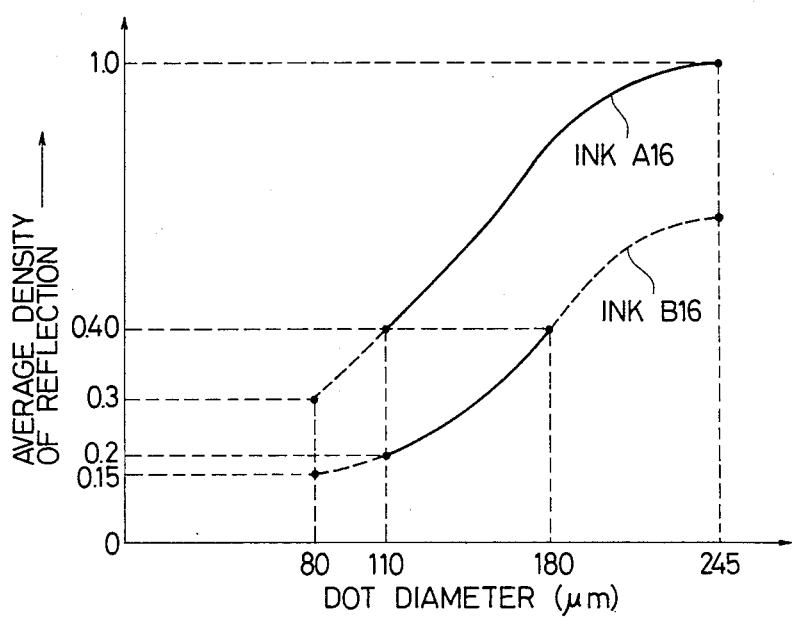
FIGS. 16 to 21 graphical representations of dot diameter-average density of optical reflection characteristics of the first to sixth embodiments of the invention.

From FIG. 16 it is seen that for both of the high density ink A16 and the low density ink B16 the range of dot diameter obtainable using the respective heads (6 and 7 in FIG. 14) each having an orifice diameter of 50 82 m$\phi$ is about 80 $\mu$m$\phi$ to 245 $\mu$m$\phi$. The range of average density of reflection representable by it is from 0.3 to 1.0 for the high density ink A16 and 0.15 to 0.65 for the low density ink B16. The two ranges overlap each other in the area ranging from 0.3 to 0.65. Therefore, the average reflection density in this area may be represented by either of the two inks A16 and B16. However, in this embodiment, in order to wring the duty ratio of the high density ink dot to 1, the switching point has been set at the point at which the dot diameter of the high density ink is 110 $\mu$m$\phi$. That is to say, the switching level lies at 0.45 of the average density of reflection.

In this embodiment, therefore, the low density ink B16 is used to cover the range of 0.2 to 0.4 in average density of reflection (110 to 180 $\mu$m in dot diameter) while the high density ink covers the range of 0.4 to 1.0 in average density of reflection (110 to 245 $\mu$m in dot diameter). The minimum dot diameter used in this embodiment was 110 μm for both of A16 and B16.

In this manner there has been obtained the desired duty ratio. In this embodiment, the dot pitch is 200 μm (because the number of PEL is 5 PEL). Therefore, even for the minimum diameter of dot, the one-dimensional duty ratio D of the high density ink becomes 110 μm/200 μm=0.55 which is desirable. We have showed a lot of people the recorded picture obtained in this embodiment for evaluation. Their impressions on the recorded image were all good. The stimulus to the eyes were small. They did not feel the picture rough. Also, almost none of them perceived the difference between the portion represented by the high density ink A16 and the portion by the low density ink B16. They felt the picture homogeneous in quality and reposeful.

In this embodiment and also in the following second and third embodiments, small dots of the minimum density ink have been formed at 5 PEL even in the minimum density area. By this design of picture, the portion left white which otherwise exists in the image area has been made disappeared from the picture. This has an effect to prevent unfavourable change in tone of the picture and, therefore, to further improve the quality of the picture.

Figure 17:
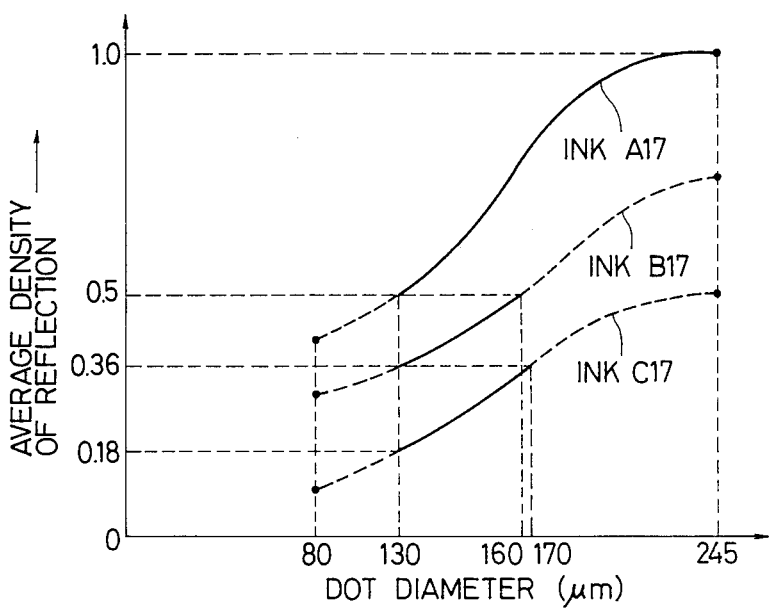

FIG. 17 shows the dot diameter-average density of reflection characteristic curves obtained in a second embodiment. In this second embodiment, although not shown in the drawings, the number of ink jet heads as shown in FIG. 14 has been increased from 2 to 3. These three individual heads were connected to three ink tanks containing ink A17 (high density), ink B17 (medium density) and ink C17 (low density) respectively. The content of dyestuff in the ink was 0.2 wt % for the low density ink C17, 0.7 wt % for the medium density ink B17 and 4.5 wt % for the high density ink A17. The orifice diameter of each of the three heads was 50 μmφ. Again the number of PEL was 5. As seen from FIG. 17, the low density ink C17 covers the average density area from 0.18 to 0.36, the medium density ink B17 covers the area ranging from 0.36 to 0.5 and the high density ink A17 covers the range of from 0.5 to 1.0. The minimum dot diameter in this embodiment was set to 130 μmφ for all of the inks A17, B17 and C17.

The density of the high density ink A17 is higher than that in the above first embodiment. Therefore, in picture design it was required to lower the duty ratio D. For this reason, in this embodiment, the duty ratio D of the minimum dot of the ink A17 was set to 0.65.

Pictures obtained in this embodiment were also good in quality. There was no notable difference in quality between the areas represented by the three different inks. The picture did not feel rough. 0.18 of minimum reflection density was attained.

Figure 18:
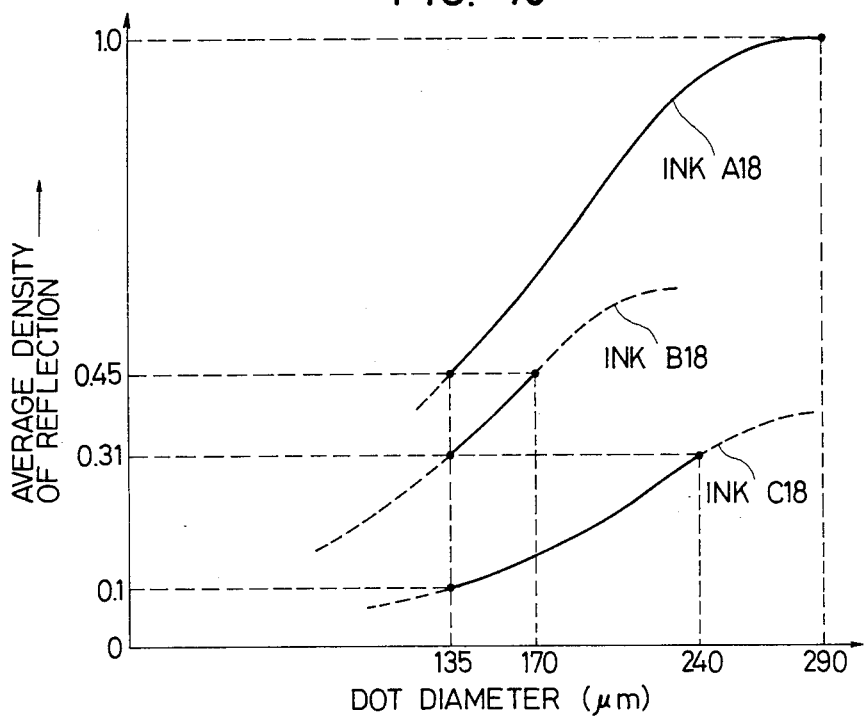

FIG. 18 shows the dot diameter/average density of reflection characteristic curves obtained in a third embodiment. In the third embodiment, the low density ink C18 (dyestuff content: 0.7 wt %) was jetted through a head orifice of 50 μmφ, the medium density ink B18 (dyestuff content: 0.8 wt %) was jetted through a head orifice of 50 μmφ and the high density ink A18 (dyestuff content: 4 wt %) was jetted through a head orifice of 65 μmφ. Again the PEL number was 5.

As seen from FIG. 18, in this embodiment we could obtain the maximum dot diameter of 290 μmφ from the high density ink head and therefore the range of average density of reflection representable was extended up to a further higher level as compared with the above embodiments. Since the high density ink A18 was not required to form dot smaller than 135 μmφ (duty ratio =0.675) a larger orifice diameter was allowed to be used for the high density ink head. It enabled further extending the range of representable reflection density. Of course, this feature of the use of different orifice diameters may be incorporated also into the above second embodiment to extend the range of representable reflection density thereby attaining the reproduction of gradient in a broader range. The present invention includes such combination of different inks and different head orifice diameters.

Figure 19:
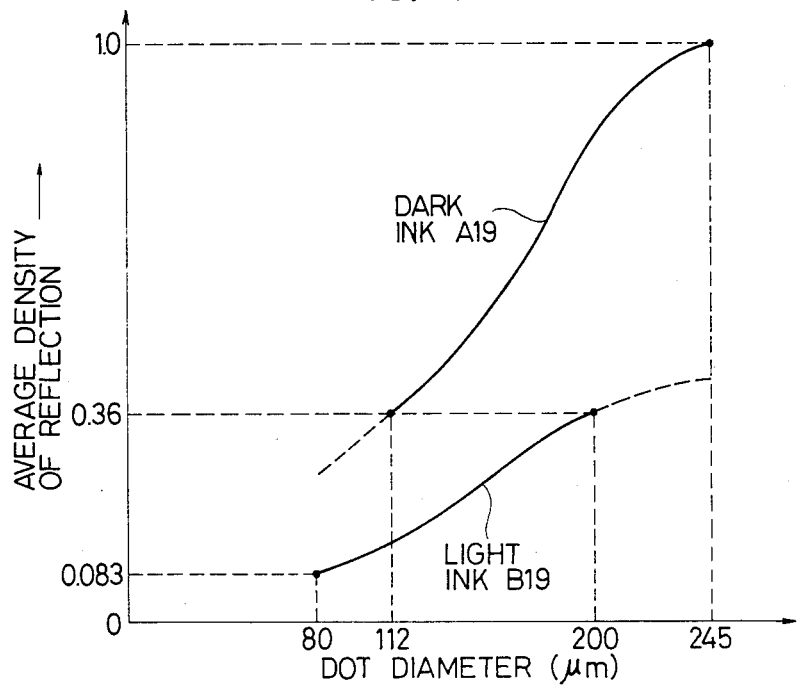
Figure 20:
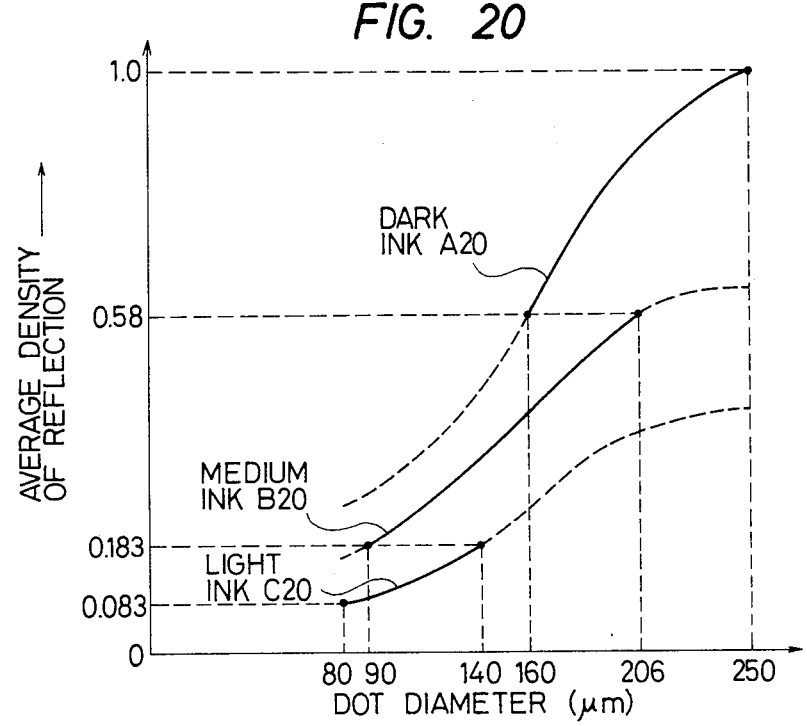
Figure 21:
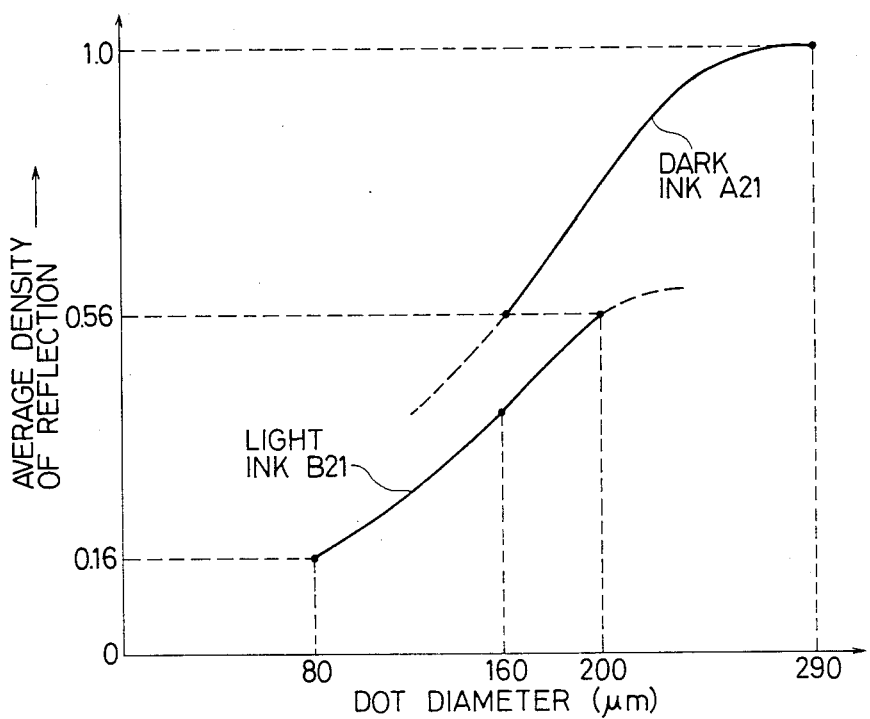

FIGS. 19, 20 and 21 show the dot diameter/ average density of reflection characteristic curves obtained in fourth, fifth and sixth embodiments (examples) respectively.

In these embodiments the diameter of the smallest dot formed by the highest density ink was so determined as to be larger than the diameter of the smallest dot formed by the lowest density ink. In this point these embodiments 4, 5 and 6 are different from the embodiments previously shown. In other points, these embodiments are essentially the same as the previous embodiments. Design data of these examples 4, 5 and 6 are given in the following table.

[TABLE 1]

| Example | Orifice diameter (μmφ) | | Density of ink (dyestuff content) (wt %) | |
|---|---|---|---|---|
| 4 | head A19 | 50 | ink A19 | 4 |
|   | head B19 | 50 | ink B19 | 0.5 |
| 5 | head A20 | 50 | ink A20 | 4 |
|   | head B20 | 50 | ink B20 | 0.7 |
|   | head C20 | 50 | ink C20 | 0.2 |
| 6 | head A21 | 60 | ink A21 | 4 |
|   | head B21 | 50 | ink B22 | 0.5 |

Under the conditions of the above examples 4, 5 and 6, a woman's photo-portrait was reproduced in cabinet size. The reproduced picture was very high in quality. Especially, the reproduction of the skin portion was excellent. It felt very natural. It did not make the observer eyes tired at all and did not give the impression of "lack of repose".

Figure 22:
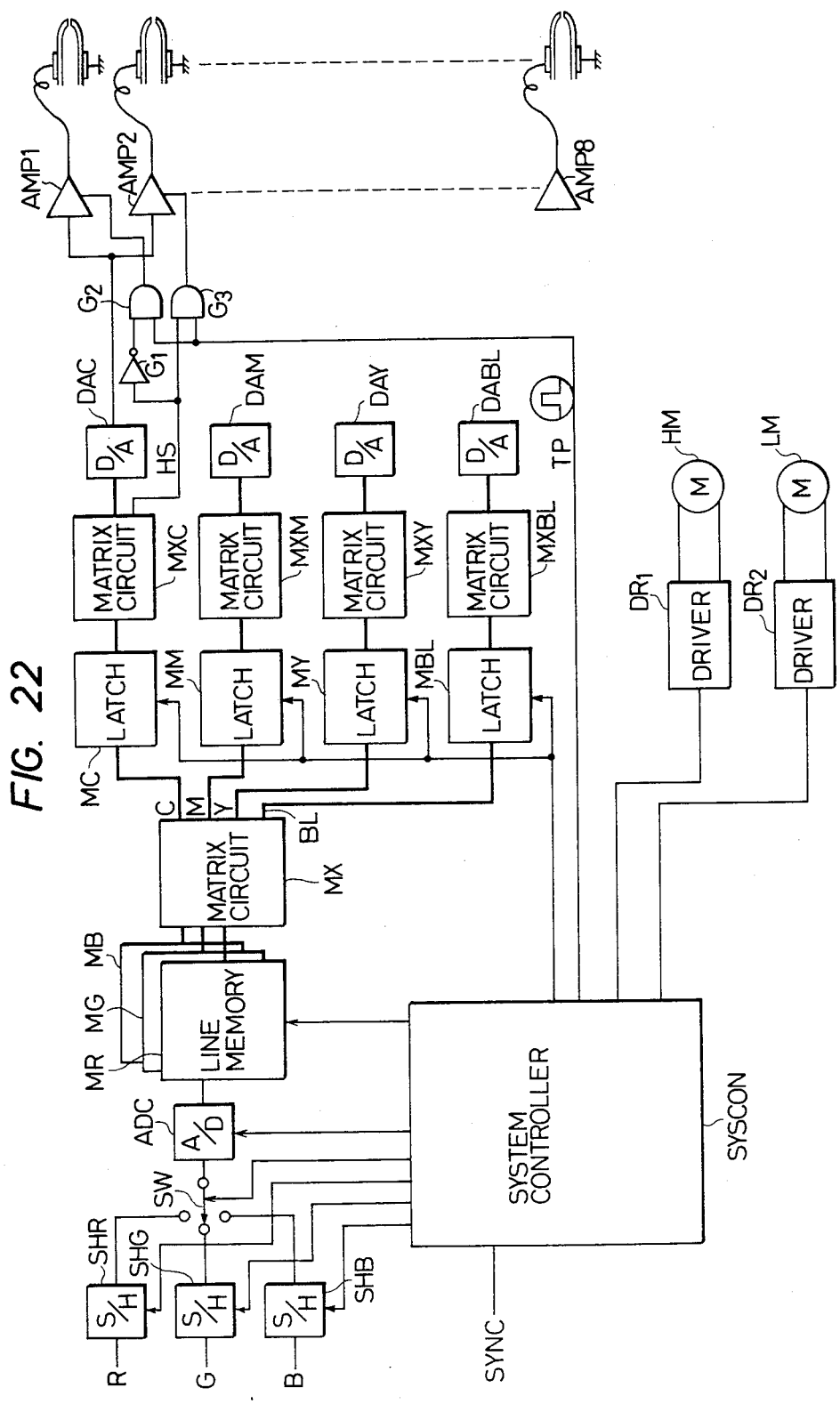
FIG. 22 is a control block diagram of a color video printer to which the first embodiment of the invention has been applied.

FIG. 22 shows a concrete example of the control circuit of the printer on which the apparatus as shown in FIG. 15 has been mounted. The printer is a printer for printing out color video signals.

Referring to FIG. 22, video signals are input to sample hold circuits SHR, SHG, SHB from R, G, B respectively. On the other hand, a synchronizing signal SYNC is input to a system controller SYSCON. The input video signals are sample-held in accordance with the timing signal from the system controller SYSCON. The sampled outputs of the color video signals are stored in line memories MR, MG, MB after passing through signal switching switch SW and A/D converter ADC. Information stored in the line memories MR, MG, BM are processed by matrix circuit MX for masking processing and under-color removing processing. The matrix circuit MX generates cyan signal C, magenta signal M, yellow signal Y and black signal BL which are then stored in latch memories MC, MM, MY and MBL respectively. Outputs from the latch memories are introduced into head control matrix circuits MXC, MXM, MXY and MXBL which convert the signals into code signals each representative of head to be selected and value of voltage to be applied. These code signals are input to D/A converters DAC, DAM, DAY and DABL to convert the code signals into analog voltage values. The voltages are applied to head drivers AMP-1–AMP8 to drive the heads selected by head selection signal HS in accordance with the desired timing signal TP. Thus, the amount of ink droplets jetted from the corresponding heads are controlled.

Figure 23:
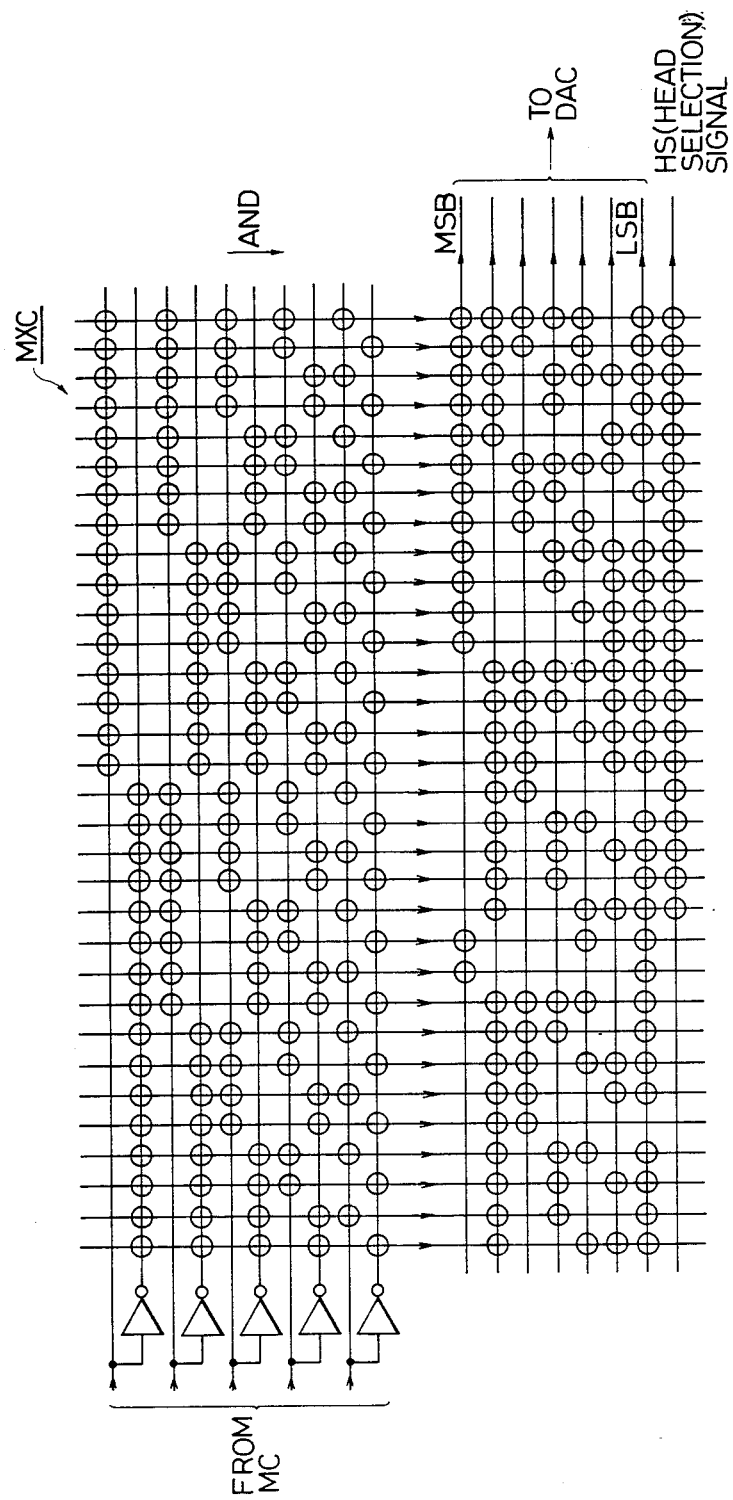
FIG. 23 is a circuit diagram showing the details of the inner arrangement of the head control matrix circuit MXC shown in FIG. 22.
Figure 24:
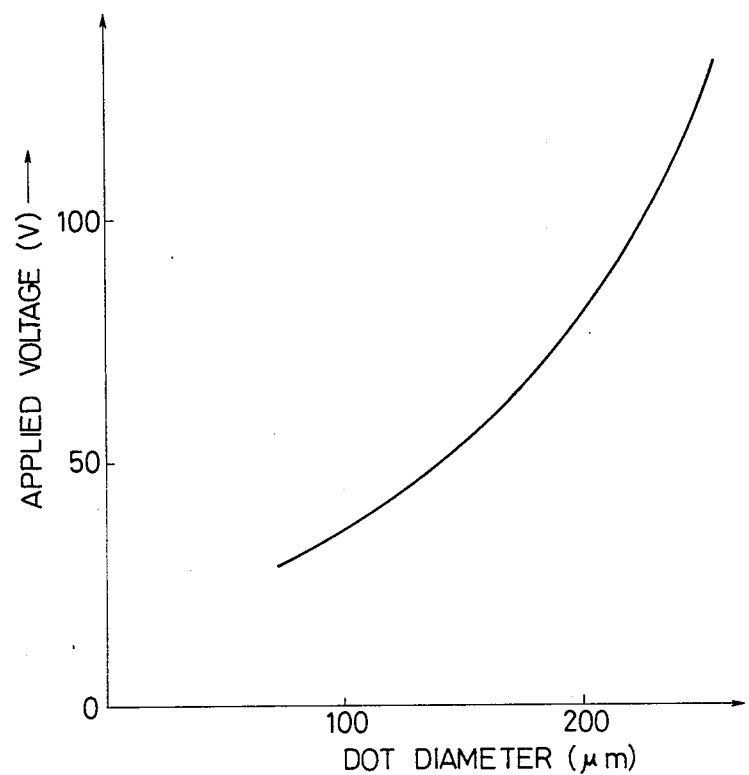
FIG. 24 is a graphical representation illustrating dot diameter - applied voltage characteristics of the head for cyan ink.

FIG. 23 is a detailed view of the inner arrangement of the cyan head control matrix circuit MXC. FIG. 24 shows the relationship between applied voltage to the cyan ink jet head H1, H2 and dot diameter. The relationship between dot diameter and average density of reflection has already been shown in FIG. 16.

The cyan matrix circuit MXC generates the head selection signal HS according to the value of the digital signal representing the density of cyan, and also generates digital signals of applied voltages to the respective heads determined by the characteristic curves shown in FIGS. 16 and 24.

FIG. 25 shows the relation of output code to input digital value, the relation of selected head to code, the relation of head applied voltage to code and reflection density obtained relating the above cyan matrix circuit shown in FIG. 23. In FIG. 25, H1 denotes the head for low density ink B16 and H2 the head for high density ink A16.

As shown in FIG. 25, the applied voltage to the head for low density ink B16 is in the range of 39 to 69 V while that to the head for high density ink A16 is in the range of 39 to 125 V. Thereby average density of reflection ranging from 0.2 to 0.4 is obtained with the low density ink B16 and average density of reflection ranging from 0.4 to 1.0 with the high density ink A16. Even when the input digital value is "00000", a small dot is formed with the low density ink B16 to prevent the presence of so-called blank portion (portion left white). To control head feed and paper feed the system controller SYSCON applied signals to a head motor HM and a paper feed motor LF through drivers DR1 and DR2 respectively.

Figure 26:
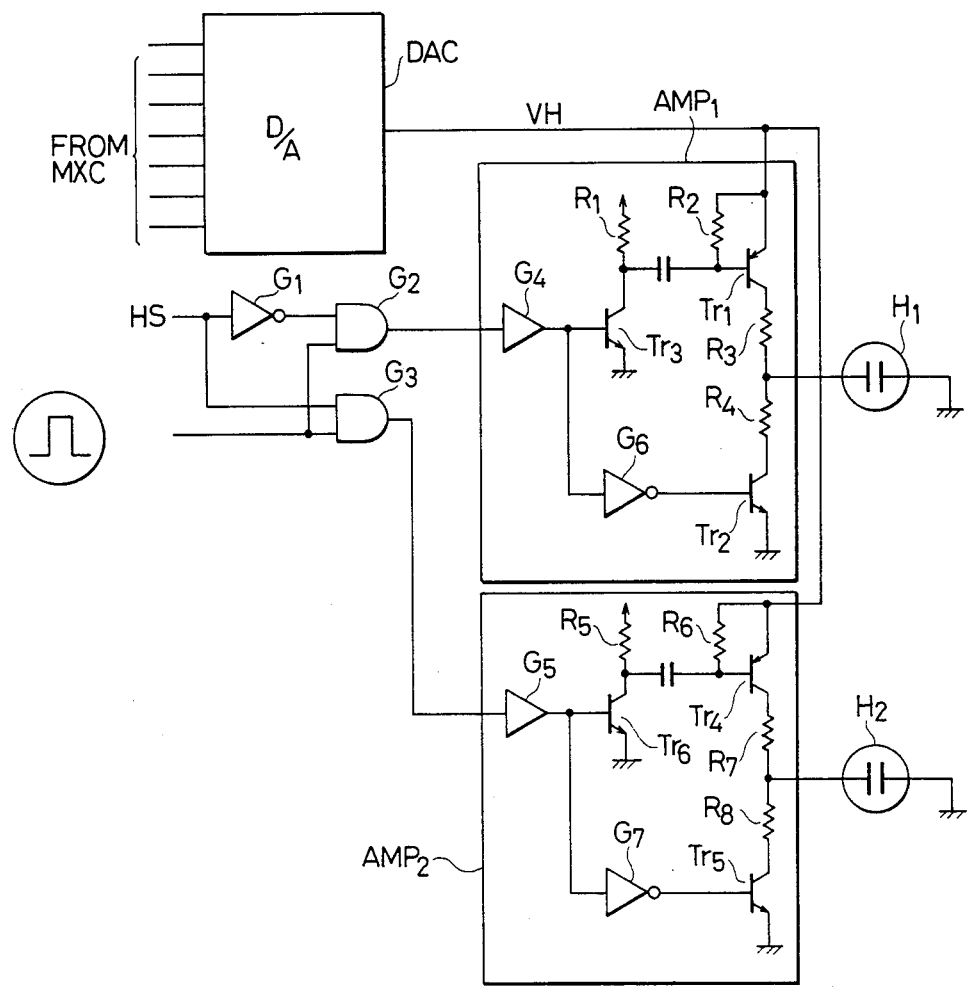
FIG. 26 is a circuit diagram showing the details of the head driver part shown in FIG. 22.

FIG. 26 is a detailed circuit diagram of the head driving part shown in FIG. 22. With reference to FIG. 26 we will describe the manner of control on the ink jet head in connection with the cyan signal processing as an example.

The D/A converter DAC for modulating the head applied voltage receives 7-bit digital signals from the matrix circuit MXC shown in FIG. 22. The converter DAC generates a voltage VH corresponding to the input digital signal. On the other hand, the head selection signal HS issued from the matrix circuit MXC is applied to one of the input terminals of AND gate G3 and also one of the input terminals of AND gate G2 through inverter G1. When the signal HS is at low level, the head H1 is selected. If HS is high, then the head H2 is selected. Applied to the other input terminal of AND gates G2 and G3 is a head driving pulse from the system controller SYSCON. For explanation's sake it is assumed that the signal HS is now low and the head H1 is selected. In this state, the other input terminal of AND gate G2 is at high level. Therefore, when the head driving pulse becomes high level, the output of G2 is rendered high and the output of buffer G4 also becomes high. Consequently, transistor Tr3 is rendered conductive and also transistor Tr1 is rendered conductive. Thereby the voltage VH is applied to the head H1 through resistor R3. This causes the piezoelectric element to contract radially inwards of the glass tube thereby jetting ink droplets from it. The volume of jetted ink droplet is controlled by the voltage VH.

At this time point, the transistor Tr2 is non-conductive because the output of inverter G6 is low. Thereafter, when the pulse is turned to low level, the transistor Tr1 is rendered non-conductive and Tr2 is rendered conductive. Thereby the charge on the head H1 is discharged through resistor 4. The piezo-electric element restores itself to its original state. In this manner, ink jet is controlled.

Although the manner of operation of the control circuit has been particularly described in connection with cyan ink only, the heads for magenta, yellow and black are controlled in the same manner as above. Also, the above description of control circuit relating the first embodiment shown in FIG. 16 are applied to the second to sixth embodiments of FIGS. 17 to 21.

Figure 27:
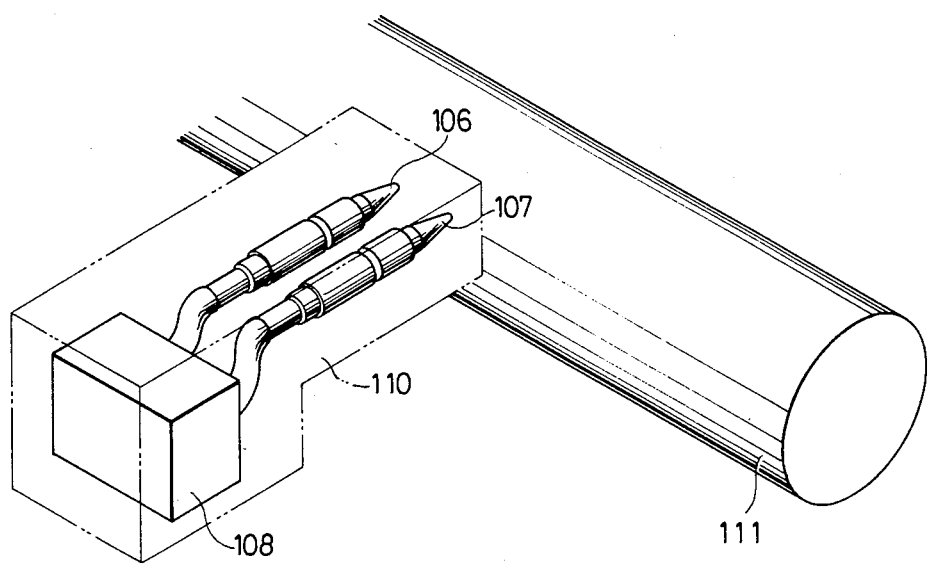
FIG. 27 is a schematic illustration of the ink jet head unit in the seventh embodiment of the invention.

FIG. 27 shows a seventh embodiment of the invention. FIG. 27 is a perspective of an ink jet head unit the construction of which is similar to that shown in FIG. 14. In FIG. 27, 106 and 107 are ink jet heads having different orifice diameters. 108 is a common ink tank to the two heads. The head unit is generally designated by 110, 111 is a platen. The head unit 110 is mounted on a carriage as previously shown in FIG. 15 is moved to carry out printing.

Figure 28:
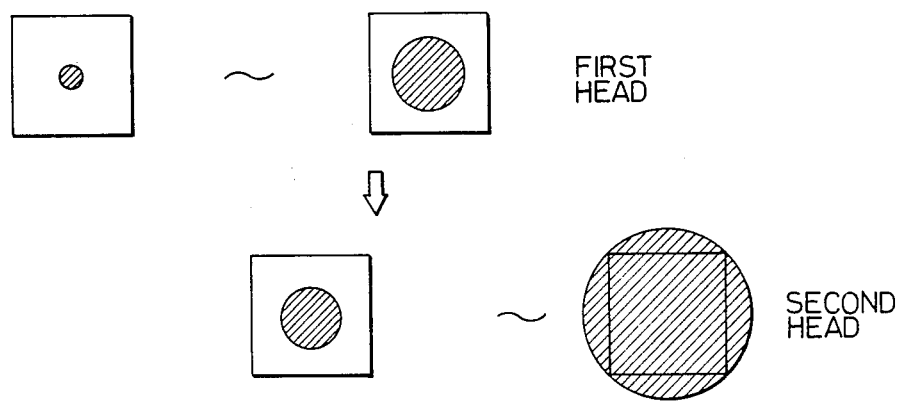
FIG. 28 shows the print dot formed by the printer of the seventh embodiment.

FIGS. 28 and 27 show the printing characteristics obtained with the printer shown in FIG. 27.

FIG. 28 illustrates the change of dot diameters with changing the applied voltage to the first and second ink jet heads having different orifice diameters. As seen from FIG. 28, it is possible change the dot diameter up to three times regarding each of the first and second heads. Therefore, even taking the overlapping of the two dots into account it is possible to change the dot diameter in total up to about six times. This means that when area ratio is considered, the representable gradient range can be extended up to about 36 times in this embodiment.

Figure 29:
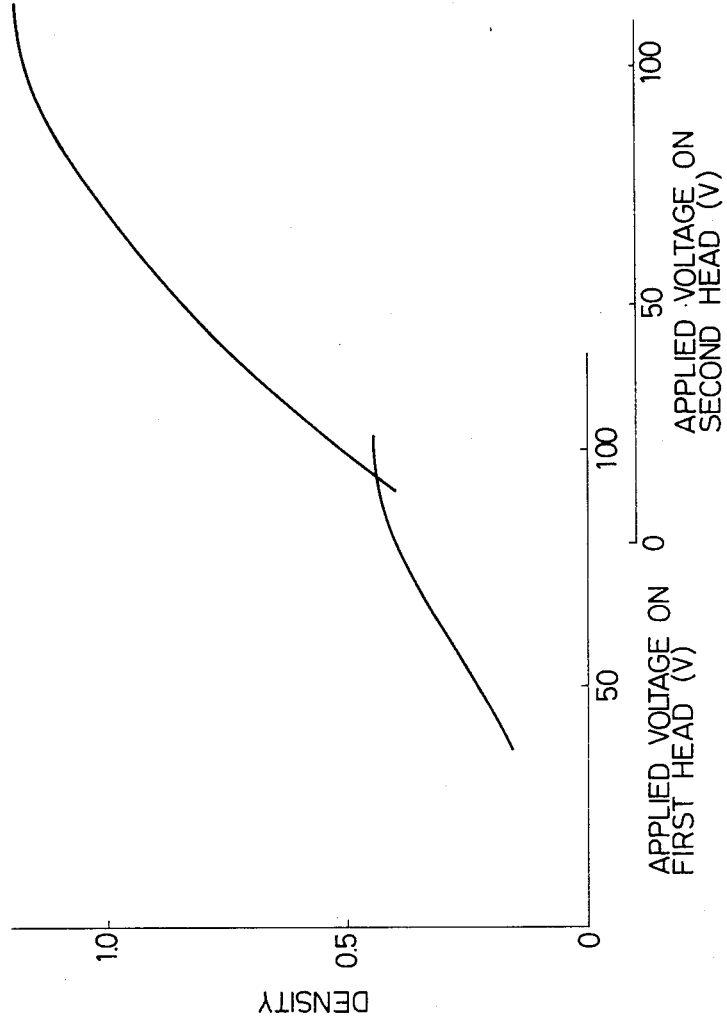
FIG. 29 shows the relationship between applied voltage and optical reflection density (that is in concentration) in the seventh embodiment.

FIG. 29 shows the relationship between applied voltage and optical reflection density with the density on the ordinate and the applied voltage to the first head on the upper abscissa and the applied voltage to the second head on the lower abscissa. In this embodiment, the orifice diameter of the first head was 20 μm and that of the second head was 65 μm. Printing was carried out at 5 dots/mm.

Figure 30:
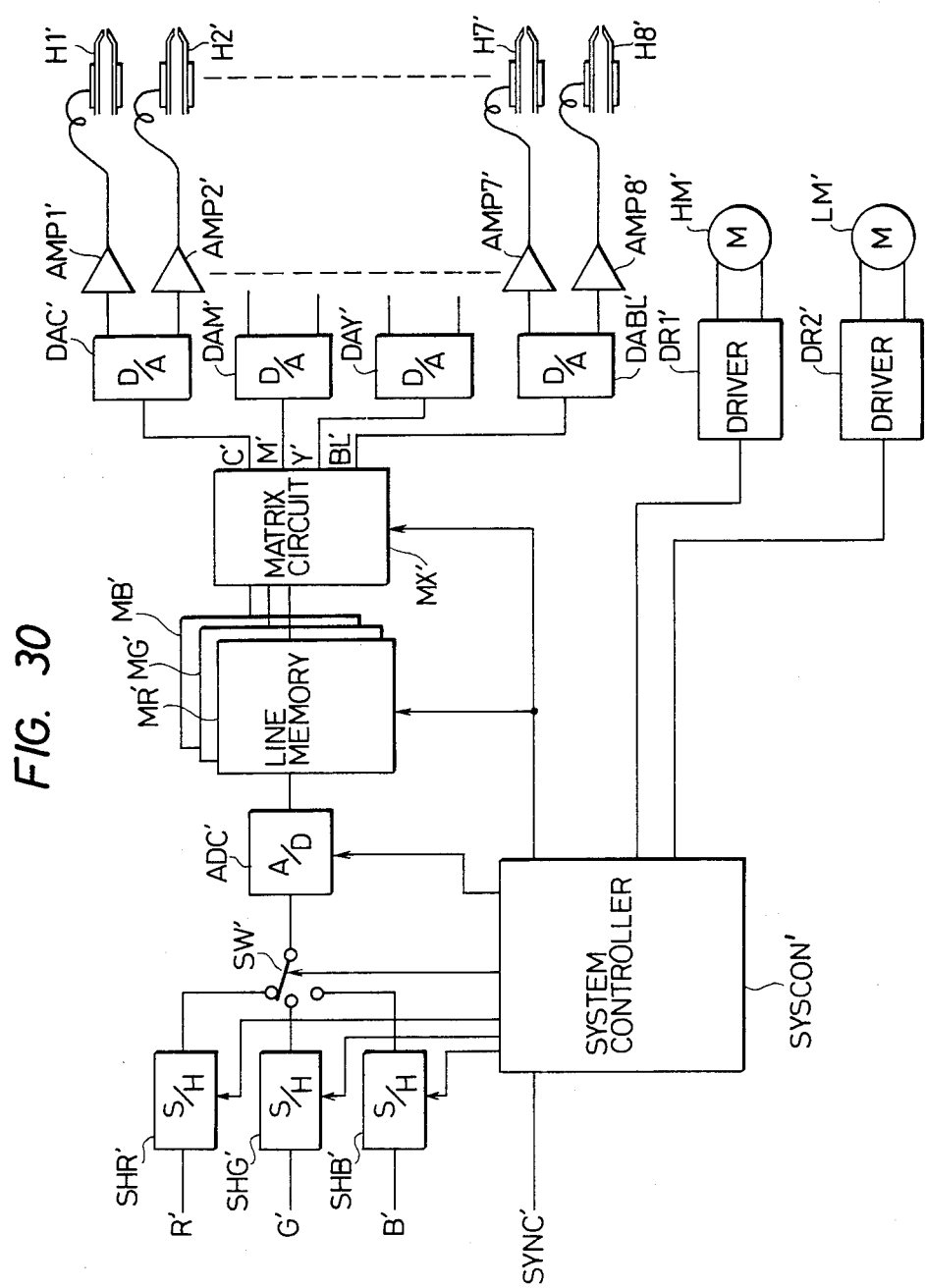
FIG. 30 is a control circuit diagram of the printer of the seventh embodiment.

FIG. 30 is a block diagram of the electric circuit for a printer to which the previously described first embodiment of the invention has been applied. The printer is a printer for printing out color video signals.

Referring to FIG. 30, video signals are input to sample hold circuits SHR', SHG', SHB' from R', G', B' respectively. On the other hand, a synchronizing signal SYNC' is input to a system controller SYSCOM'. The input video signals are sample-held in accordance with the timing signal from the system controller SYSCOM'. The sampled outputs of the color video signals are stored in line memories MR', MG', MB' after passing through signal switching switch SW' and A/D converter ADC'. Information stored in the line memories MR', MG', MB' are processed by matrix circuit MX' for masking processing and under-color removing processing. The matrix circuit MX' generates cyan signal C', magenta signal M', yellow signal Y' and black signal BL' which are input to D/A converters DAC', DAM', DAY' and DABL'. Through head drivers AMP- 1'–AMP8', the heads then selected from heads H1'–H8' are controlled in accordance with the output signals from the D/A converters. To control head feeding and paper feeding, the controller SYSCOM' applies signals to a head motor HM' and a paper feed motor LM' through drivers DR1' and DR2' respectively.

Figure 31:
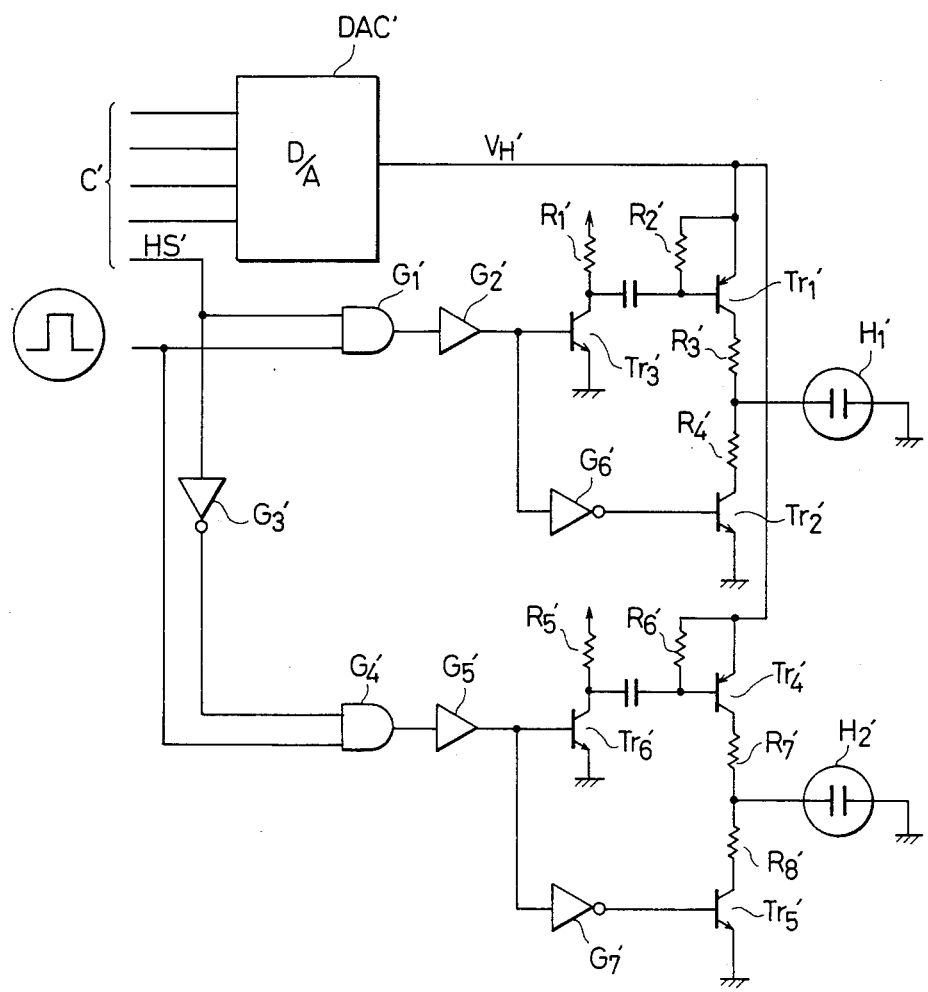
FIG. 31 is a detailed circuit diagram of a part thereof.

FIG. 31 is a detailed circuit diagram of the head driving part shown in FIG. 30. With reference to FIG. 31 we will describe the manner of control on the ink jet head in connection with the cyan signal processing as an example.

The D/A converter DAC for modulating the head applied voltage receives less significant 4 bits of digital signal C' from the matrix circuit MX' shown in FIG. 22. The converter DAC generates a voltage VH' corresponding to the input digital signal. On the other hand, the most significant one bit of the signal C', that is, a head selection signal HS' from the matrix circuit MXC is applied to one of the input terminals of AND gate G1' and also one of the input terminals of AND gate G4' through inverter G3'. When the signal HS' is at low level, the head H1' is selected. If HS' is high, then the head H2' is selected. Applied to the other input terminal of AND gates G1' and G4' is a head driving pulse. For explanation's sake it is assumed that the signal HS' is now low and the head H1' is selected. In this state, the other input terminal of AND gate G1' is at high level. Therefore, when the head driving pulse becomes high level, the output of G1' is rendered high and the output of buffer G2' also becomes high. Consequently, transistor Tr3' is rendered conductive and also transistor Tr1' is rendered conductive. Thereby the voltage V'H is applied to the head H1' through resistor R3'. This causes the piezo-electric element to contract radially inwards of the glass tube thereby jetting ink droplets from it.

At this time point, the transistor Tr2' is non-conductive because the output of inverter G6' is low. Thereafter, when the pulse is turned to low level, the transistor Tr1' is rendered non-conductive and Tr2' is rendered conductive. Thereby the charge on the head H1' is discharged through resistor 4. The piezo-electric element restores itself to its original state. In this manner, ink jet is controlled.

As readily understood from the foregoing, according to the seventh embodiment the multi-gradient reproduction of picture can be carried in a very simple manner without the use of dither process or the like. Ink jet heads having different orifice diameters, means for selectively driving the heads and control means for controlling the volume of the respective ink droplets jetted from the heads are provided for a printer according to the embodiment.

While the seventh embodiment has been described in connection with an ink jet recording method in which cylindrical piezo-electric elements are used, it is to be understood that the embodiment is applicable also to other known ink jet recording methods as disclosed, for example, in U.S. Pat. No. 3,946,398, German Patent Application laid open Nos. 2,843,064 and 2,944,005. Further, it is to be understood that the application of the invention is never limited to ink jet recording method only. It is applicable to many other image-forming apparatus such as electrophotographic apparatus, electrostatic recording apparatus and thermal recording apparatus provided that it is able to represent gradient. As the picture forming elementary particle, circular dots have been particularly shown in the above embodiments. The shape of picture forming elementary particle is not limitative but may be variously changed. For example, the present invention is applicable also to linear patterns as formed by scan lines in a television display.

The advantages of the picture-forming method of the invention over the prior art are obvious from the above detailed description.

It is easy to carry out and enables the improved reproduction of gradient. In the pictures obtained according to the invention, the stimulus to eyes which is usually caused by the use of high density picture forming elementary particles, is greatly moderated. The picture does not feel "rough" and "lack of repose". Thus, pictures having improved gradient and high quality can be obtained in a simple manner according to the invention.

What is claimed is:

1. A method of forming on a medium a picture comprising a plurality of picture elements with different light-reflecting properties that provide different optical reflection densities by usng picture forming elementary particles to form the picture elements, the method comprising the steps of:

providing on the medium a first type of elementary particle having a first concentration to form picture elements the optical reflection densities of which are higher than a perdetermined level and having a size varied in accordance with the optical reflection density of the picture element to be formed, substantially all of said first type of elementary particles having a size of a least about 80 microns;

providing on the medium a second type of elementary particle having a second concentration lower than said first concentration to form picture elements the optical reflection densities of which are lower than the predetermined level and having a size varied in accordance with the optical reflection density of the picture element to be formed; and determining said predetermined optical reflection density level so that, if the range of the optical reflection densities of the particles is defined by representing a minimum optical reflection density as 0 and a maximum optical reflection density as 1.0, optical reflection densities at least below about 0.3 are provided by the second type of particle.

2. Apparatus for forming on a medium a picture comprising a plurality of picture elements with different light-reflecting properties that provide different optical reflection densities by using picture forming elementary particles to form the picture elements, the apparatus comprising:

first printing means for providing on the medium a first type of elementary particle having a first concentration to form picture elements the optical reflection densities of which are higher than a first predetermined level, said particle size being varied in accordance with the optical reflection density of the picture element to be formed, substantially all of said first type of elementary particles having a size of at least about 80 microns;

second printing means for providing on the medium a second type of elementary particle having a second concentration lower than said first concentration to form picture elements the optical reflection densities of which are lower than a second predetermined level, said particle size being varied in accordance with the optical reflection density of the picture element to be formed; and selection means responsive to the picture element optical reflection density for selecting said first printing means when the picture element optical reflection density is higher than the first predetermined optical reflection density level and said second printing means when the picture element optical reflection density is below the second predetermiend optical reflection density level, wherein if the range of the optical reflection densities of the particles is defined by representing a minimum optical reflection density as 0 and a maximum optical reflection densities as 1.0, optical reflecton densities at least below about 0.3 are provided by the second type of particle.

3. The appartus of claim 2, wherein twice the size of the first type of elementary particle, divided by the distance between the particles, is at least about 0.5.

4. The apparatus of claim 2, wherein said first and second printing means include ink jet heads.

5. The apparatus of claim 4, wherein each of said ink jet heads includes a piezo-electric element.

6. The apparatus of claim 5, wherein said ink jet head of said first printing means has an orifice diameter larger than the orifice diameter of said ink jet head of said second printing means.

* * * * *

UNITED STATES PATENT AND TRADEMARK OFFICE
CERTIFICATE OF CORRECTION

PATENT NO. : 4,713,746         Page 1 of 4

DATED : December 15, 1987

INVENTOR(S) : YOSHITAKA WATANABE, ET AL.

It is certified that error appears in the above-identified patent and that said Letters Patent is hereby corrected as shown below:

AT [57] IN THE ABSTRACT

Line 8, "to" should read --of--.
Line 9, "repse-" should read --repre- --.

COLUMN 1

Line 46, "such" should read --so--.
Line 61, "man" should read --one--.

COLUMN 2

Line 22, "as mere" should read --as a mere--.
Line 33, "belt" should read --felt--.
Line 52, "disadvantage" should read --disadvantages--.

COLUMN 3

Line 43, "graphical" should read --are graphical--.
Line 65, "(that is in concentra-" should be deleted.
Line 66, "tion)" should be deleted.

COLUMN 4

Line 7, "density." should read --density (that is, in concentration).--
Line 18, "analyized." should read --analyzed.--.

UNITED STATES PATENT AND TRADEMARK OFFICE
CERTIFICATE OF CORRECTION

PATENT NO. : 4,713,746
DATED : December 15, 1987
INVENTOR(S) : YOSHITAKA WATANABE, ET AL.

It is certified that error appears in the above-identified patent and that said Letters Patent is hereby corrected as shown below:

COLUMN 5

Lines 8-9, "From it" should read --From it $N \to \infty$--.

Line 13, "$\omega_0=2\pi T$" should read --$\omega_0=2\pi/T$--.

COLUMN 6

Line 51, "1" should be deleted.
Line 68, "$F(f_0)$:" should read --$F^2(f_0)$:--.

COLUMN 7

Line 12, "of" (second occurrence) should read --to--.
Line 15, "medium," should read --medium--.
Line 43, "$f_0$was" should read --$f_0$ was--.
Line 44, "200 μm;" should read --200 μm.--.

COLUMN 11

Line 16, "details" should read --detail--.

COLUMN 12

Line 19, "dyepigment)" should read --dye-pigment)--.
Line 46, "represent" should read --representing--.
Line 52, "82 mφ" should read --μmφ--.
Line 59, "wring" should read --bring--.

UNITED STATES PATENT AND TRADEMARK OFFICE
CERTIFICATE OF CORRECTION

PATENT NO. : 4,713,746

DATED : December 15, 1987

INVENTOR(S) : YOSHITAKA WATANABE, ET AL.

It is certified that error appears in the above-identified patent and that said Letters Patent is hereby corrected as shown below:

COLUMN 14

Table 1, line 36, "ink B22" should read --ink B21--.
Line 59, "BM" should read --MB--.

COLUMN 16

Line 25, "is" (second occurrence) should be deleted.
Line 33, "change" should read --to change--.
Line 54, "B're-" should read --B' re---.
Line 56, "SYSCOM'." should read --SYSCON'.--.
Line 58, "SYSCOM'." should read --SYSCON'.--.

COLUMN 17

Line 4, "SYSCOM'" should read --SYSCON'--.
Line 47, "carried" should read --carried out--.

COLUMN 18

Line 21, "usng" should read --using--.

COLUMN 19

Line 10, "miend" should read --mined--.
Line 14, "densities" should read --density--.
Line 14, "reflecton" should read --reflection--.

UNITED STATES PATENT AND TRADEMARK OFFICE
CERTIFICATE OF CORRECTION

PATENT NO. : 4,713,746

DATED : December 15, 1987

INVENTOR(S) : YOSHITAKA WATANABE, ET AL.

It is certified that error appears in the above-identified patent and that said Letters Patent is hereby corrected as shown below:

COLUMN 20

Line 3, "appartus" should read --apparatus--.

Signed and Sealed this

Nineteenth Day of July, 1988

Attest:

DONALD J. QUIGG

Attesting Officer

Commissioner of Patents and Trademarks